(12) United States Patent
Smith et al.

(10) Patent No.: US 11,267,334 B2
(45) Date of Patent: Mar. 8, 2022

(54) EVAPORATIVE EMISSIONS CONTROL SYSTEM AND METHOD FOR ISOLATING FUEL TANK FROM A PURGE CANISTER

(71) Applicant: Eaton Intelligent Power Limited, Dublin (IE)

(72) Inventors: Jeffrey B. Smith, Rochester Hills, MI (US); Vaughn K. Mills, Chelsea, MI (US); Daniel Pifer, Chelsea, MI (US); Nikhil Nahar, Farmington, MI (US); Steven Ambrose, Farmington Hills, MI (US); Max Franklin, Birmingham, MI (US)

(73) Assignee: Eaton Intelligent Power Limited, Dublin (IE)

(*) Notice: Subject to any disclaimer, the term of this patent is extended or adjusted under 35 U.S.C. 154(b) by 0 days.

(21) Appl. No.: 16/865,240

(22) Filed: May 1, 2020

(65) Prior Publication Data

US 2020/0254869 A1   Aug. 13, 2020

Related U.S. Application Data

(63) Continuation of application No. PCT/EP2018/025276, filed on Nov. 4, 2018.
(Continued)

(30) Foreign Application Priority Data

Nov. 1, 2018   (IN) .............................. 201811041422

(51) Int. Cl.
*B60K 15/035* (2006.01)
*B60K 15/03* (2006.01)
*F02M 25/08* (2006.01)

(52) U.S. Cl.
CPC .. *B60K 15/03519* (2013.01); *B60K 15/03504* (2013.01); *B60K 2015/03217* (2013.01);
(Continued)

(58) Field of Classification Search
None
See application file for complete search history.

(56) References Cited

U.S. PATENT DOCUMENTS 5,983,963 A * 11/1999 Pozgainer ........ B60K 15/03519
137/588
9,464,601 B2 * 10/2016 Bolger .................. F02D 41/004
(Continued)

FOREIGN PATENT DOCUMENTS

WO     2016049320 A1    3/2016
WO  WO-2016049320 A1 *  3/2016  .......... F02M 25/089
WO     2016168258 A1   10/2016

OTHER PUBLICATIONS

International Search Report and Written Opinion for International Application No. PCT/EP2018/0258276 dated Jun. 13, 2019.

*Primary Examiner* — Kevin R Steckbauer
(74) *Attorney, Agent, or Firm* — RMCK Law Group PLC

(57) ABSTRACT

A method for operating an evaporative emissions control system for use with a fuel tank that stores and delivers fuel to an internal combustion engine is provided. A vent shut-off assembly is provided that selectively opens and closes at least one valve to provide overpressure and vacuum relief for the fuel tank. The vent shut-off assembly selectively vents to a purge canister. The at least one valve is closed whereby vapor is precluded from passing from the fuel tank to the purge canister. A purge event is performed wherein dedicated fresh air is drawn into the purge canister and delivered from the purge canister to the engine.

13 Claims, 17 Drawing Sheets

Related U.S. Application Data

(60) Provisional application No. 62/745,763, filed on Oct. 15, 2018, provisional application No. 62/581,580, filed on Nov. 3, 2017, provisional application No. 62/581,586, filed on Nov. 3, 2017, provisional application No. 62/581,469, filed on Nov. 3, 2017.

(52) U.S. Cl.
CPC .............. *B60K 2015/03243* (2013.01); *B60K 2015/03514* (2013.01); *B60K 2015/03576* (2013.01); *B60K 2015/03585* (2013.01); *F02M 25/089* (2013.01); *F02M 25/0836* (2013.01); *F02M 25/0872* (2013.01)

(56) References Cited

U.S. PATENT DOCUMENTS

| | | | |
|---|---|---|---|
| 9,494,325 B2 * | 11/2016 | Shimokawa | B60K 15/03519 |
| 9,732,706 B2 * | 8/2017 | Dudar | F02M 25/0836 |
| 10,029,559 B2 * | 7/2018 | Shimokawa | F02M 37/0082 |
| 10,288,013 B2 * | 5/2019 | Dudar | B60K 15/03519 |
| 10,343,515 B2 * | 7/2019 | Kim | F02D 19/0647 |
| 10,400,713 B2 * | 9/2019 | Mills | F02M 25/0872 |
| 10,598,134 B1 * | 3/2020 | Dudar | F02M 26/47 |
| 10,662,900 B2 * | 5/2020 | Franklin | F16K 31/0627 |
| 10,766,757 B2 * | 9/2020 | Dudar | B60K 15/03504 |
| 10,774,792 B2 * | 9/2020 | Mills | F02M 25/0836 |
| 10,828,981 B2 * | 11/2020 | Mills | F02M 25/0836 |
| 10,828,982 B2 * | 11/2020 | Mills | F16K 31/52408 |
| 11,092,113 B2 * | 8/2021 | Franklin | F16K 5/166 |
| 2005/0279406 A1 * | 12/2005 | Atwood | B60K 15/035 137/39 |
| 2014/0230920 A1 * | 8/2014 | Shimokawa | F24D 19/083 137/197 |
| 2015/0122228 A1 * | 5/2015 | Bolger | F02D 41/004 123/518 |
| 2015/0306951 A1 * | 10/2015 | Shimokawa | F02M 25/0836 206/205 |
| 2017/0030302 A1 * | 2/2017 | Takezawa | B60K 15/03519 |
| 2017/0045019 A1 * | 2/2017 | Dudar | F02M 25/0854 |
| 2017/0120745 A1 * | 5/2017 | Kim | B60K 15/03006 |
| 2017/0292476 A1 * | 10/2017 | Dudar | B67D 7/04 |
| 2017/0328311 A1 * | 11/2017 | Franklin | F16K 11/0836 |
| 2018/0029468 A1 * | 2/2018 | Mills | B60K 15/03519 |
| 2018/0087475 A1 * | 3/2018 | Mills | B60K 15/03519 |
| 2019/0105984 A1 * | 4/2019 | Mills | F02M 25/089 |
| 2019/0145326 A1 * | 5/2019 | Nahar | B60K 15/03504 123/519 |
| 2019/0219002 A1 * | 7/2019 | Mills | B01D 53/0446 |
| 2019/0353121 A1 * | 11/2019 | Mills | F02M 25/0836 |
| 2020/0055390 A1 * | 2/2020 | Benjey | B60K 15/03 |
| 2020/0180939 A1 * | 6/2020 | Dudar | B60Q 1/2665 |
| 2020/0198462 A1 * | 6/2020 | Kou | B60K 15/03519 |
| 2020/0254869 A1 * | 8/2020 | Smith | F02M 25/0818 |
| 2020/0284226 A1 * | 9/2020 | Franklin | B60K 15/03519 |
| 2020/0391585 A1 * | 12/2020 | Pifer | F02M 25/0836 |
| 2020/0398661 A1 * | 12/2020 | Mills | B60K 15/03519 |
| 2020/0400104 A1 * | 12/2020 | Mills | B60K 15/035 |
| 2021/0053437 A1 * | 2/2021 | Mills | B60K 15/035 |

\* cited by examiner

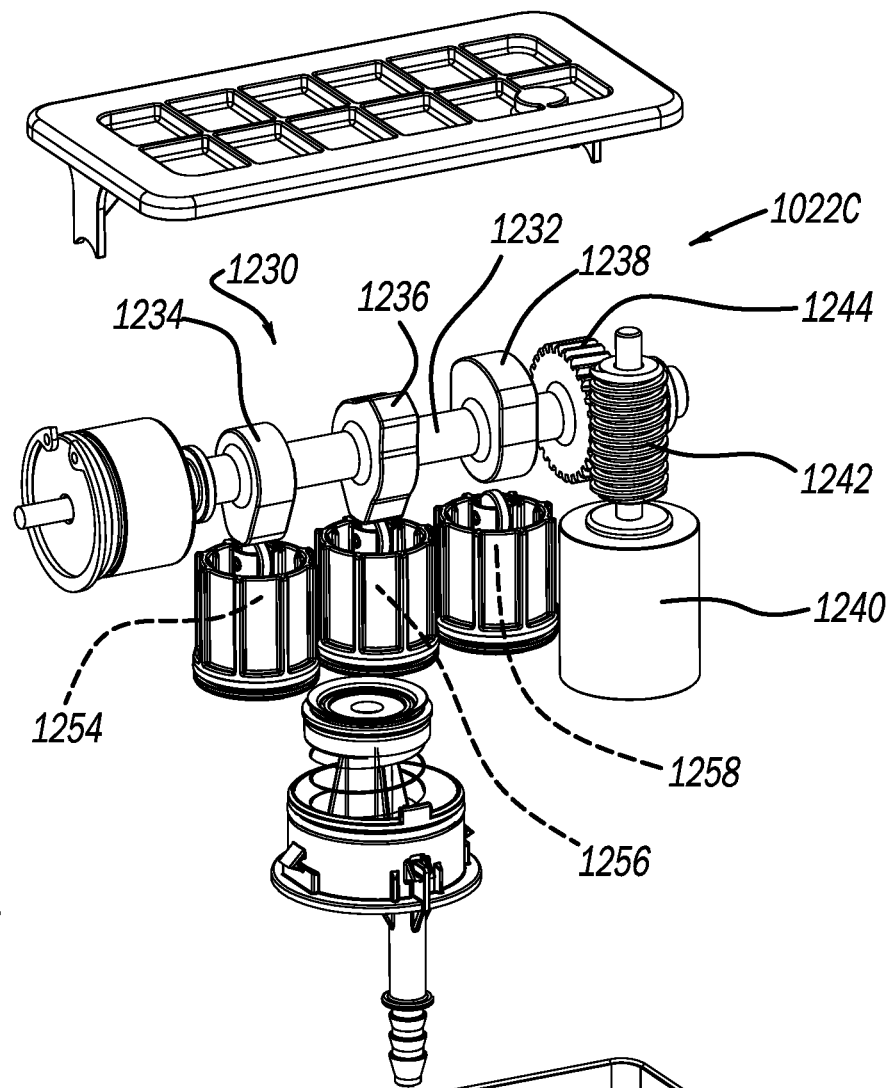
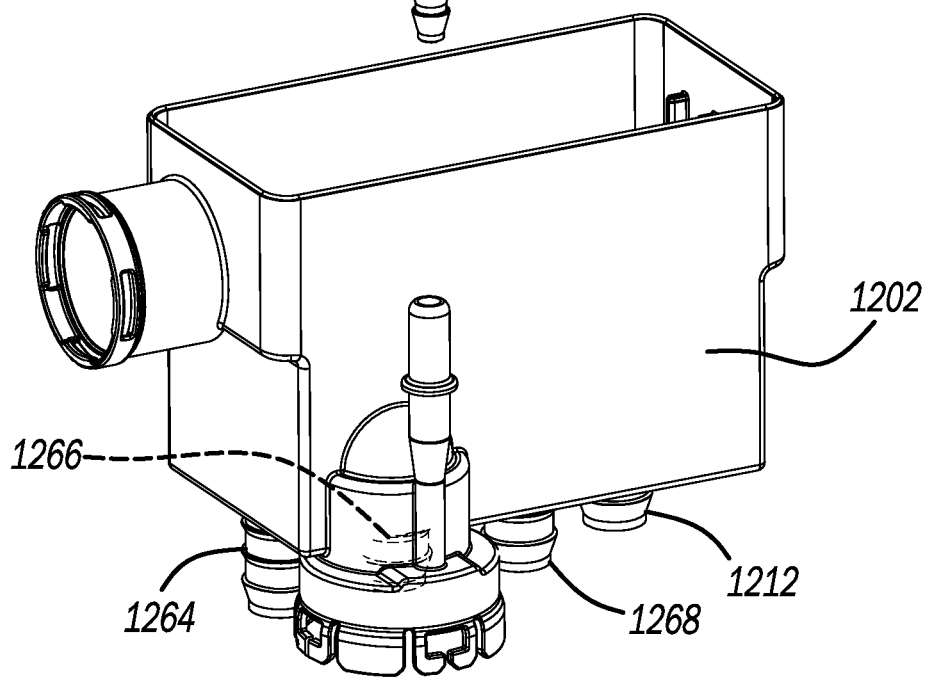
FIG - 13

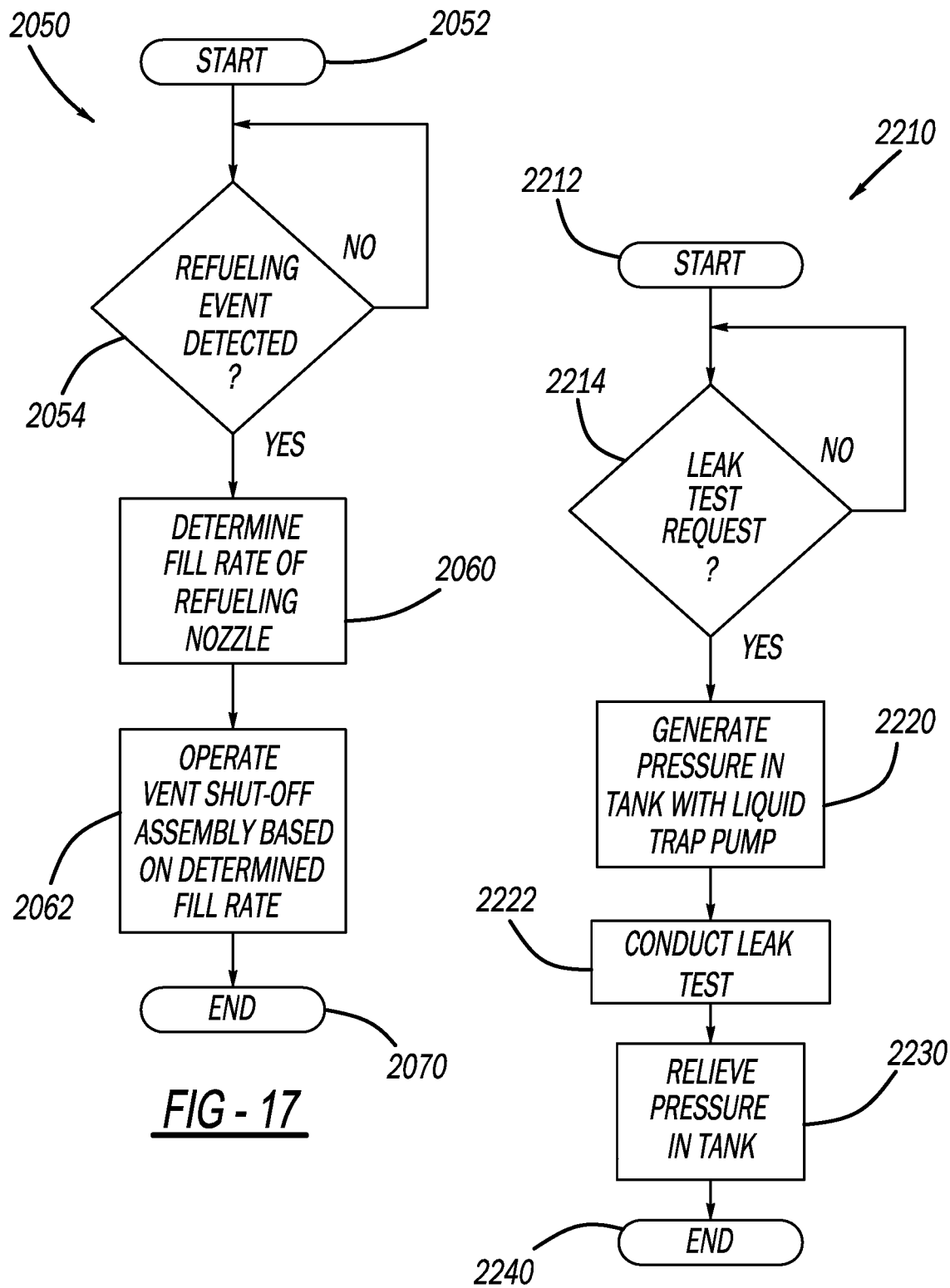

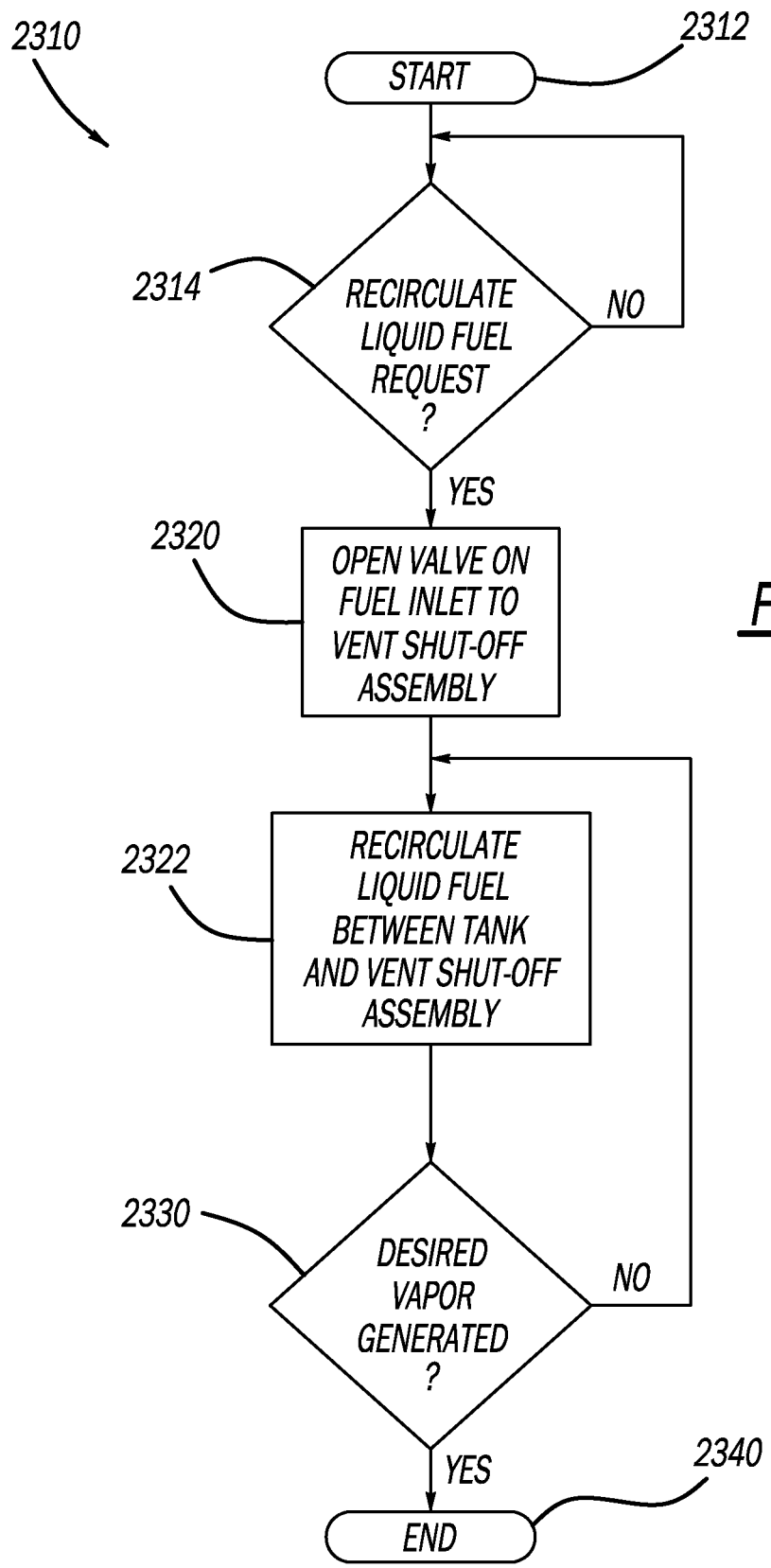

EVAPORATIVE EMISSIONS CONTROL SYSTEM AND METHOD FOR ISOLATING FUEL TANK FROM A PURGE CANISTER

CROSS REFERENCE TO RELATED APPLICATION

This application is a continuation of International Application No. PCT/EP2018/025276 filed Nov. 4, 2018, which claims the benefit of U.S. Provisional Application No. 62/581,586 filed Nov. 3, 2017; U.S. Provisional Application No. 62/581,469 filed Nov. 3, 2017; U.S. Provisional Application No. 62/581,580 filed Nov. 3, 2017; U.S. Provisional Application No. 62/745,763 filed Oct. 15, 2018; and Indian Provisional Application No. 201811041422 filed Nov. 1, 2018, the contents of which are incorporated herein by reference thereto.

FIELD

The present disclosure relates generally to fuel tanks on passenger vehicles and more particularly to a fuel tank having an electronically controlled module that manages the complete evaporative system for the vehicle, the fuel system implementing a method that isolates the fuel tank from a purge canister.

BACKGROUND

Fuel vapor emission control systems are becoming increasingly more complex, in large part in order to comply with environmental and safety regulations imposed on manufacturers of gasoline powered vehicles. Along with the ensuing overall system complexity, complexity of individual components within the system has also increased. Certain regulations affecting the gasoline-powered vehicle industry require that fuel vapor emission from a fuel tank's ventilation system be stored during periods of an engine's operation. In order for the overall vapor emission control system to continue to function for its intended purpose, periodic purging of stored hydrocarbon vapors is necessary during operation of the vehicle.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method for operating an evaporative emissions control system for use with a fuel tank that stores and delivers fuel to an internal combustion engine is provided. A vent shut-off assembly is provided that selectively opens and closes at least one valve to provide overpressure and vacuum relief for the fuel tank. The vent shut-off assembly selectively vents to a purge canister. The at least one valve is closed whereby vapor is precluded from passing from the fuel tank to the purge canister. A purge event is performed wherein dedicated fresh air is drawn into the purge canister and delivered from the purge canister to the engine.

According to additional features, vapor is precluded from passing from the fuel tank to the purge canister during the purge event. Closing the at least one valve includes rotating at least one cam that in turn closes a respective at least one valve. Rotating the at least one cam includes rotating a rotary actuator that rotates a camshaft having the at least one cam arranged thereon. The at least one valve comprises a first and a second valve. The at least one cam comprises a first and a second cam. Closing the at least one valve comprises rotating the first and second cams that in turn close the respective first and second valves. Performing the purge event includes delivering the fresh air drawn into the purge canister to the engine through an engine vent line.

An evaporative emissions control system configured to recapture and recycle emitted fuel vapor on a vehicle fuel tank includes a first vent tube, a first vent valve, a vent shut-off assembly, a purge canister and a control module. The first vent tube is disposed in the fuel tank. The first vent valve is disposed on the first vent tube that is configured to selectively open and close a first port fluidly coupled to the first vent tube. The vent shut-off assembly is configured on a housing that selectively opens and closes the first valve to provide overpressure and vacuum relief for the fuel tank. The purge canister is fluidly coupled to the vent shut-off assembly through a canister vent line. The purge canister has a canister inlet configured to accept fresh air therethrough. The control module regulates operation of the vent shut-off assembly based on operating conditions. The control module is configured to close the first valve during a purge event wherein dedicated fresh air is drawn into the canister inlet and delivered from the purge canister to an engine.

According to other features, the evaporative emissions control system includes a second vent tube and second vent valve. The second vent tube is disposed in the fuel tank. The second vent valve is disposed on the second vent tube and is configured to selectively open and close a second port fluidly coupled to the second vent tube. The vent shut-off assembly is configured to selectively open and close the second valve to provide overpressure and vacuum relief for the fuel tank. The control module is configured to close the second valve during a purge event. The vent shut-off assembly precludes vapor from passing through the canister vent line during a purge event.

A method for operating an evaporative emissions control system for use with a fuel tank that stores and delivers fuel to an internal combustion engine according to another example is provided. A vent shut-off assembly is provided that selectively opens and closes first and second valves to provide overpressure and vacuum relief for the fuel tank. A fill rate of fuel is determined during a refueling event. The vent shut-off assembly is operated based on the determined fill rate.

According to other features, determining the fill rate comprises monitoring a signal from a fuel tank level sensor. Determining the fill rate according to another example comprises monitoring a signal from a fuel tank pressure sensor. Operating the vent shut-off assembly includes opening at least one of the valves based on the determined fill rate. Operating the at least one valve includes opening the at least one valve a predetermined minimal amount as a function of tank pressure during a refueling event. A trickle fill portion of the refueling event is determined. The vent shut-off assembly is operated during the trickle fill portion to mitigate at least one of spit, spray and well back.

A method for operating an evaporative emissions control system for use with a fuel tank that stores and delivers fuel to an internal combustion engine according to another example is provided. A vent shut-off assembly is provided that selectively opens and closes first and second valves to provide overpressure and vacuum relief for the fuel tank. A fill rate of fuel is monitored during a refueling event. A spike in pressure during the monitoring is determined. A determination whether the spike will influence a premature shut-off of a fill nozzle dispensing the fuel is determined. The vent shut-off assembly is operated to prevent premature shut-off. The vent shut-off assembly is operated by opening at least one of the valves to relieve pressure.

A fuel tank system constructed in accordance to one example of the present disclosure includes a fuel tank, a first vent tube, an evaporative emissions control system, a cam driven tank venting control assembly and a controller. The first vent tube is disposed in the fuel tank. The evaporative emissions control system is configured to recapture and recycle emitted fuel vapor. The cam driven tank venting control assembly has a rotary actuator that rotates a cam assembly based on operating conditions. The cam assembly has at least a first cam having a first cam profile configured to selectively open and close the first vent tube based on operating conditions. The controller commands a signal to the tank venting control assembly to open the vent tube a predetermined minimal amount as a function of tank pressure during a refueling event.

According to additional features, the predetermined minimal amount does not trigger a premature shut off (PSO). The predetermined minimal amount is further a function of at least one of fill rate, fill level and temperature. The controller operates the tank venting control assembly to minimize an amount of vapor delivered to the canister during refueling.

A method for operating an evaporative emissions control system for use with a fuel tank that stores and delivers fuel to an internal combustion engine according to another example is provided. A vent shut-off assembly is provided that selectively opens and closes first and second valves to provide overpressure and vacuum relief for the fuel tank. The vent shut-off assembly has a liquid trap pump. The at least one valve is closed. The liquid trap pump is activated to raise a pressure in the fuel tank to a predetermined test pressure. A leak test is conducted while the fuel tank is at the predetermined test pressure. The tank pressure is monitored with a fuel tank pressure sensor.

A method for operating an evaporative emissions control system for use with a fuel tank that stores and delivers fuel to an internal combustion engine according to another example is provided. A vent shut-off assembly is provided that selectively opens and closes first and second valves to provide overpressure and vacuum relief for the fuel tank. The vent shut-off assembly has a liquid trap pump. Liquid fuel is accumulated within a housing of the vent shut-off assembly. The liquid trap pump is activated to pump the liquid fuel back out into the fuel tank from the housing. Control continues to accumulate and activate to recirculate liquid fuel between the fuel tank and the housing of the vent shut-off assembly. Accumulating liquid fuel comprises receiving liquid fuel through a fuel inlet defined through the housing.

An evaporative emissions control system configured to recapture and recycle fuel vapor on a vehicle fuel tank is provided. The evaporative emissions control system includes a first vent tube, a first vent valve, a vent shut-off assembly, a fuel inlet port, a liquid trap pump and a control module. The first vent tube is disposed in the fuel tank. The first vent valve is disposed on the first vent tube and is configured to selectively open and close a first port fluidly coupled to the first vent tube. The vent shut-off assembly is configured on a housing that selectively opens and closes the first valve to provide overpressure and vacuum relief for the fuel tank. The fuel inlet port is defined on the housing that selectively permits liquid fuel to enter the housing. The liquid trap pump pumps the liquid fuel back out into the fuel tank from the housing. The control module regulates operation of the vent shut-off assembly based on operating conditions. The evaporative emissions control system further includes a second vent tube disposed in the fuel tank and a second vent valve disposed on the second vent tube that is configured to selectively open and close a second port fluidly coupled to the second vent tube. The vent shut-off assembly selectively opens and closes the second valve to provide overpressure and vacuum relief for the fuel tank. The liquid trap pump can recirculate the liquid fuel between the fuel tank and the housing of the vent shut-off assembly. The liquid trap pump can be one of a venturi pump and a piston pump.

BRIEF DESCRIPTION OF THE DRAWINGS

The present disclosure will become more fully understood from the detailed description and the accompanying drawings, wherein:

FIG. 13 is an exploded view of the vent shut-off assembly of FIG. 10;

FIG. 17 is an exemplary flow diagram of another method for operating an evaporative emissions control system according to the present disclosure;

FIG. 18 is an exemplary flow diagram of another method for operating an evaporative emissions control system according to the present disclosure; and FIG. 19 is an exemplary flow diagram of another method for operating an evaporative emissions control system according to the present disclosure.

DETAILED DESCRIPTION

Figure 1:
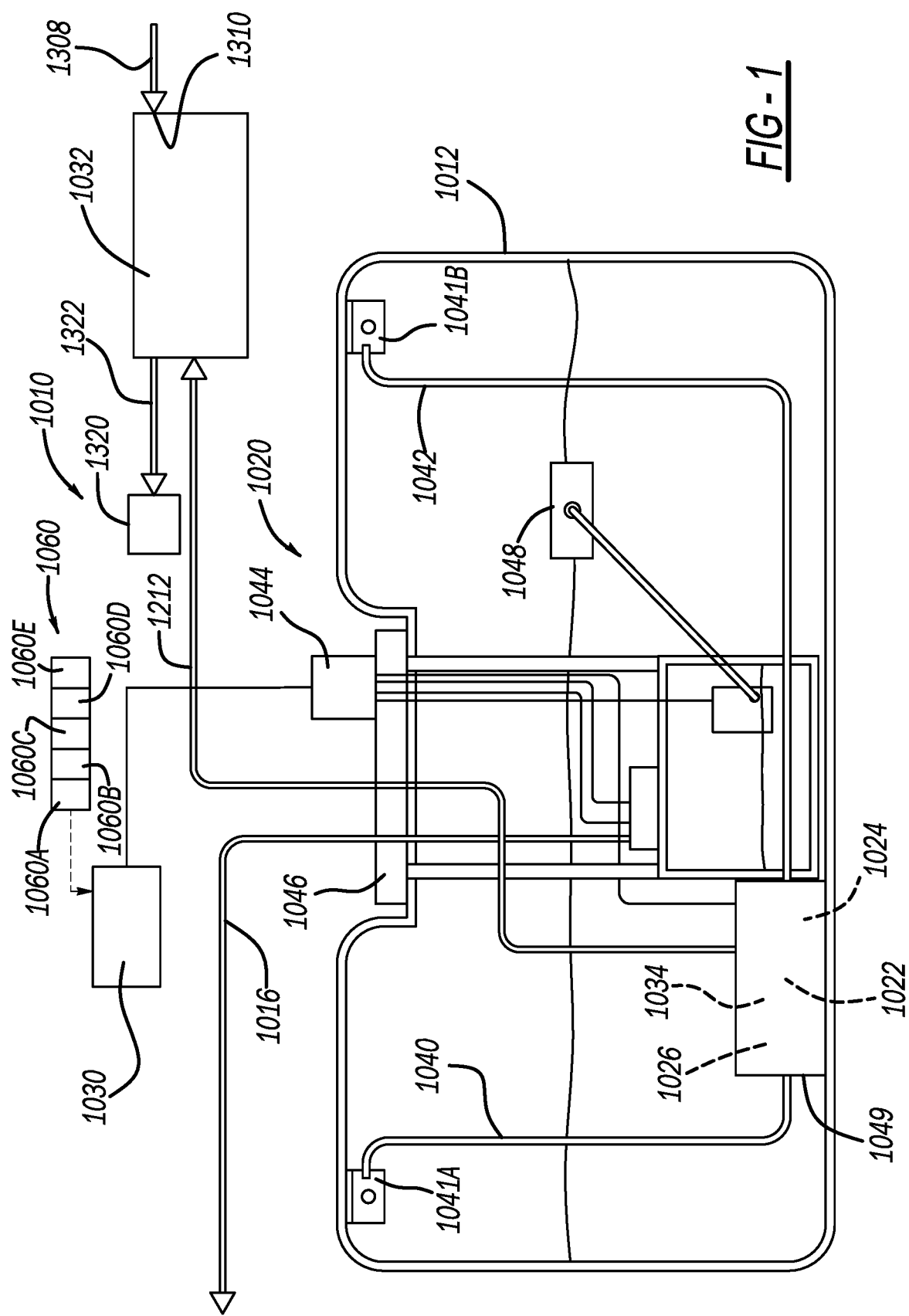
FIG. 1 is a schematic illustration of a fuel tank system having an evaporative emissions control system including a vent shut-off assembly, a controller, an electrical connector and associated wiring in accordance to one example of the present disclosure.

With initial reference to FIG. 1, a fuel tank system constructed in accordance to one example of the present disclosure is shown and generally identified at reference number 1010. The fuel tank system 1010 can generally include a fuel tank 1012 configured as a reservoir for holding fuel to be supplied to an internal combustion engine via a fuel delivery system, which includes a fuel pump 1014. The fuel pump 1014 can be configured to deliver fuel through a fuel supply line 1016 to a vehicle engine. An evaporative emissions control system 1020 can be configured to recapture and recycle the emitted fuel vapor. As will become appreciated from the following discussion, the evaporative emissions control system 1020 provides an electronically controlled module that manages the complete evaporative system for a vehicle.

The evaporative emissions control system 1020 provides a universal design for all regions and all fuels. In this regard, the requirement of unique components needed to satisfy regional regulations may be avoided. Instead, software may be adjusted to satisfy wide-ranging applications. In this regard, no unique components need to be revalidated saving time and cost. A common architecture may be used across vehicle lines. Conventional mechanical in-tank valves may be replaced. As discussed herein, the evaporative control system 1020 may also be compatible with pressurized systems including those associated with hybrid powertrain vehicles.

The evaporative emissions control system 1020 includes a vent shut-off assembly 1022, a manifold assembly 1024, a liquid trap 1026, a control module 1030, a purge canister 1032, an energy storage device 1034, a first vapor tube 1040, a second vapor tube 1042, an electrical connector 1044, a fuel delivery module (FDM) flange 1046 and a float level sensor assembly 1048. The first vapor tube 1040 can terminate at a vent opening 1041A that may include a baffle arranged at a top corner of the fuel tank 1012. Similarly, the second vapor tube 1042 can terminate at a vent opening 1041B that may include a baffle arranged at a top corner of the fuel tank 1012.

In one example, the manifold assembly 1024 can include a manifold body 1049 (FIG. 3) that routes venting to an appropriate vent tube 1040 and 1042 (or other vent tubes) based on operating conditions. As will become appreciated from the following discussion, the vent shut-off assembly 1022 can take many forms such as electrical systems including solenoids and mechanical systems including DC motor actuated cam systems.

Figure 2:
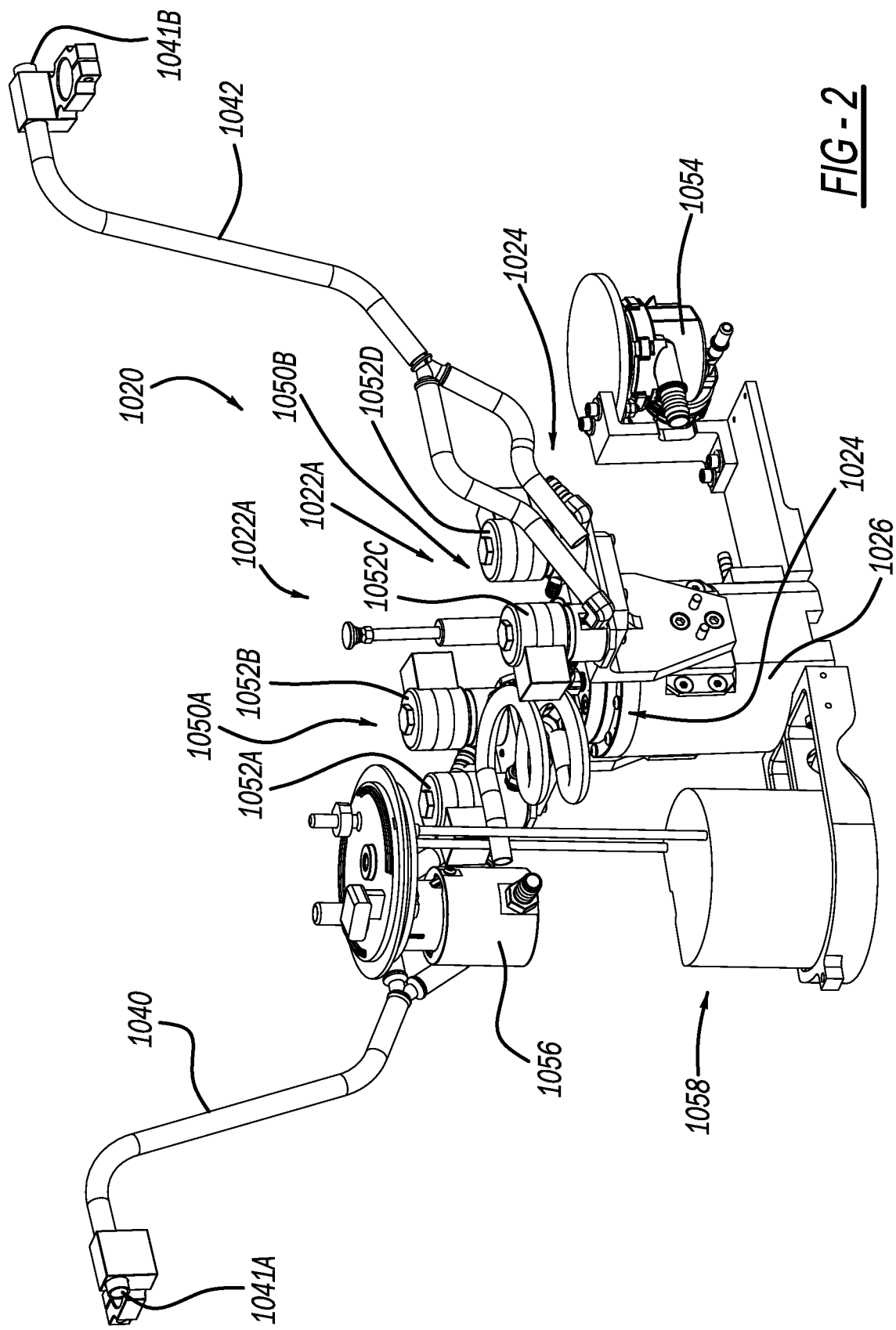
FIG. 2 is a front perspective view of an evaporative emissions control system including a vent shut-off assembly configured with solenoids according to one example of the present disclosure.
Figure 3:
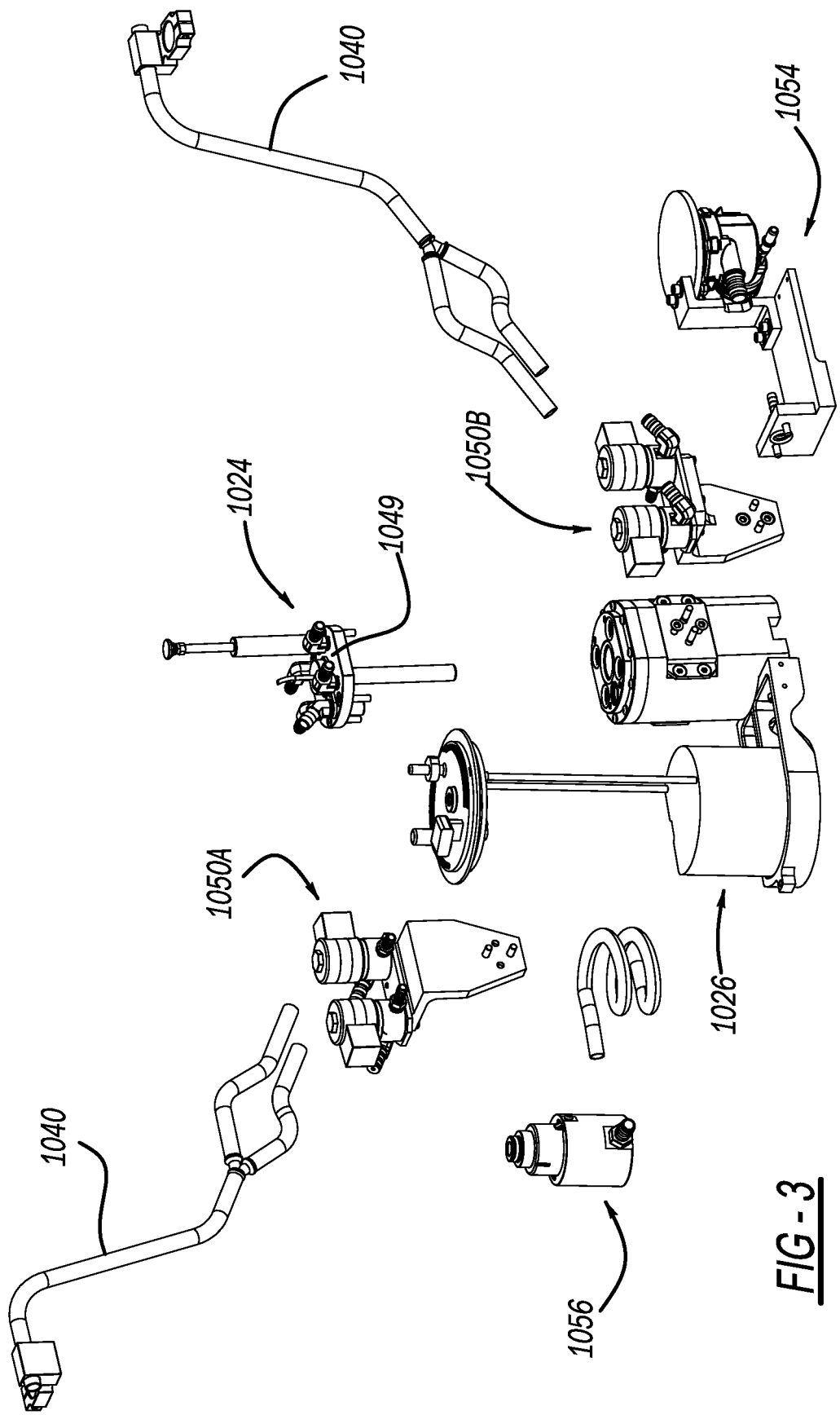
FIG. 3 is an exploded view of the evaporative emissions control system of FIG. 2.

Turning now to FIGS. 2 and 3, a vent shut-off assembly 1022A constructed in accordance to one example of the present disclosure is shown. As can be appreciated, the vent shut-off assembly 1022A can be used as part of an evaporative emissions control system 1020 in the fuel tank system 1010 described above with respect to FIG. 1. The vent shut-off assembly 1022A includes two pair of solenoid banks 1050A and 1050B. The first solenoid bank 1050A includes first and second solenoids 1052A and 1052B. The second solenoid bank 1050B includes third and fourth solenoids 1052C and 1052D.

The first and second solenoids 1052A and 1052B can be fluidly connected to the vapor tube 1040. The third and fourth solenoids 1052C and 1052D can be fluidly connected to the vapor tube 1042. The control module 1030 can be adapted to regulate the operation of the first, second, third and fourth solenoids 1052A, 1052B, 1052C and 1052D to selectively open and close pathways in the manifold assembly 1024, in order to provide over-pressure and vacuum relief for the fuel tank 1012. The evaporative emissions control assembly 1020 can additionally comprise a pump 1054, such as a venturi pump and a safety rollover valve 1056. A conventional sending unit 1058 is also shown.

The control module 1030 can further include or receive inputs from system sensors, collectively referred to at reference 1060. The system sensors 1060 can include a tank pressure sensor 1060A that senses a pressure of the fuel tank 1012, a canister pressure sensor 1060B that senses a pressure of the canister 1032, a temperature sensor 1060C that senses a temperature within the fuel tank 1012, a tank pressure sensor 1060D that senses a pressure in the fuel tank 1012 and a vehicle grade sensor and or vehicle accelerometer 1060E that measures a grade and/or acceleration of the vehicle. It will be appreciated that while the system sensors 1060 are shown as a group, that they may be located all around the fuel tank system 1010.

The control module 1030 can additionally include fill level signal reading processing, fuel pressure driver module functionality and be compatible for two-way communications with a vehicle electronic control module (not specifically shown). The vent shut-off assembly 1022 and manifold assembly 1024 can be configured to control a flow of fuel vapor between the fuel tank 1012 and the purge canister 1032. The purge canister 1032 adapted to collect fuel vapor emitted by the fuel tank 1012 and to subsequently release the fuel vapor to the engine. The control module 1030 can also be configured to regulate the operation of evaporative emissions control system 1020 in order to recapture and recycle the emitted fuel vapor. The float level sensor assembly 1048 can provide fill level indications to the control module 1030.

When the evaporative emissions control system 1020 is configured with the vent shut-off assembly 1022A, the control module 1030 can close individual solenoids 1052A-1052D or any combination of solenoids 1052A-1052D to vent the fuel tank system 1010. For example, the solenoid 1052A can be actuated to close the vent 1040 when the float level sensor assembly 1048 provides a signal indicative of a full fuel level state. While the control module 1030 is shown in the figures generally remotely located relative to the solenoid banks 1050A and 1050B, the control module 1030 may be located elsewhere in the evaporative emissions control system 1020 such as adjacent the canister 1032 for example.

With continued reference to FIGS. 1-3, additional features of the evaporative emissions control system 1020 will be described. In one configuration, the vent tubes 1040 and 1042 can be secured to the fuel tank 1012 with clips. The inner diameter of the vent tubes 1040 and 1042 can be 3-4 mm. In some examples, the poppet valve assembly or cam lobes will determine smaller orifice sizes. The vent tubes 1040 and 1042 can be routed to high points of the fuel tank 1012. In other examples, external lines and tubes may additionally or alternatively be utilized. In such examples, the external lines are connected through the tank wall using suitable connectors such as, but not limited to, welded nipple and push-through connectors.

As identified above, the evaporative emissions control system 1020 can replace conventional fuel tank systems that require mechanical components including in-tank valves with an electronically controlled module that manages the complete evaporative system for a vehicle. In this regard, some components that may be eliminated using the evaporative emissions control system 1020 of the instant disclosure can include in-tank valves such as GVV's and FLVV's, canister vent valve solenoid and associated wiring, tank pressure sensors and associated wiring, fuel pump driver module and associated wiring, fuel pump module electrical connector and associated wiring, and vapor management valve(s) (system dependent). These eliminated components are replaced by the control module 1030, vent shut-off assembly 1022, manifold 1024, solenoid banks 1050A, 1050B and associated electrical connector 1044. Various other components may be modified to accommodate the evaporative emissions control system 1020 including the fuel tank 1012. For example, the fuel tank 1012 may be modified to eliminate valves and internal lines to pick-up points. The flange of the FDM 1046 may be modified to accommodate other components such as the control module 1030 and/or the electrical connector 1044. In other configurations, the fresh air line of the canister 1032 and a dust box may be modified. In one example, the fresh air line of the canister 1032 and the dust box may be connected to the control module 1030.

Figure 4:
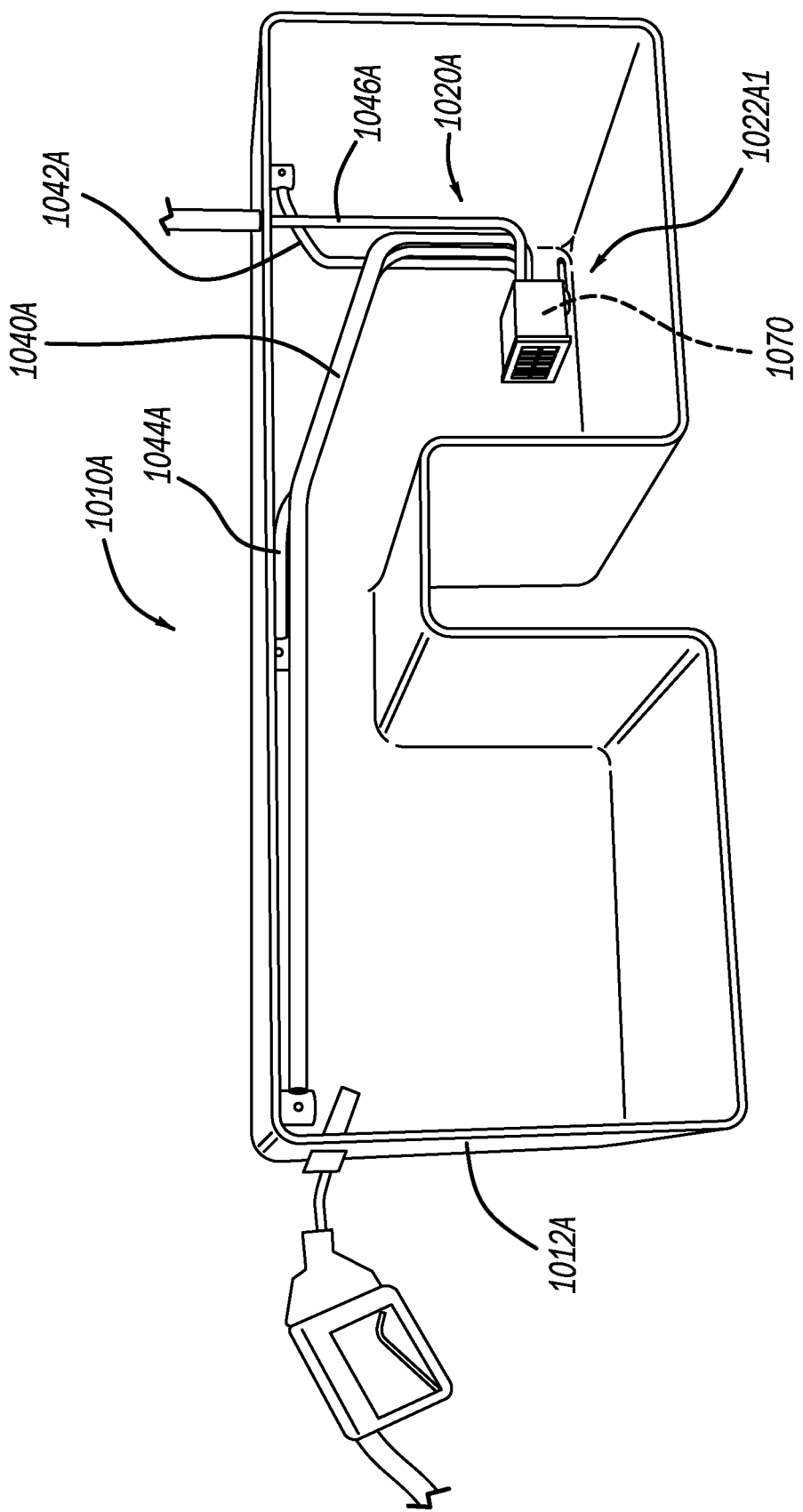
FIG. 4 is a perspective view of a fuel tank system having a vent shut-off assembly and configured for use on a saddle fuel tank according to another example of the present disclosure and shown with the fuel tank in section view.
Figure 5:
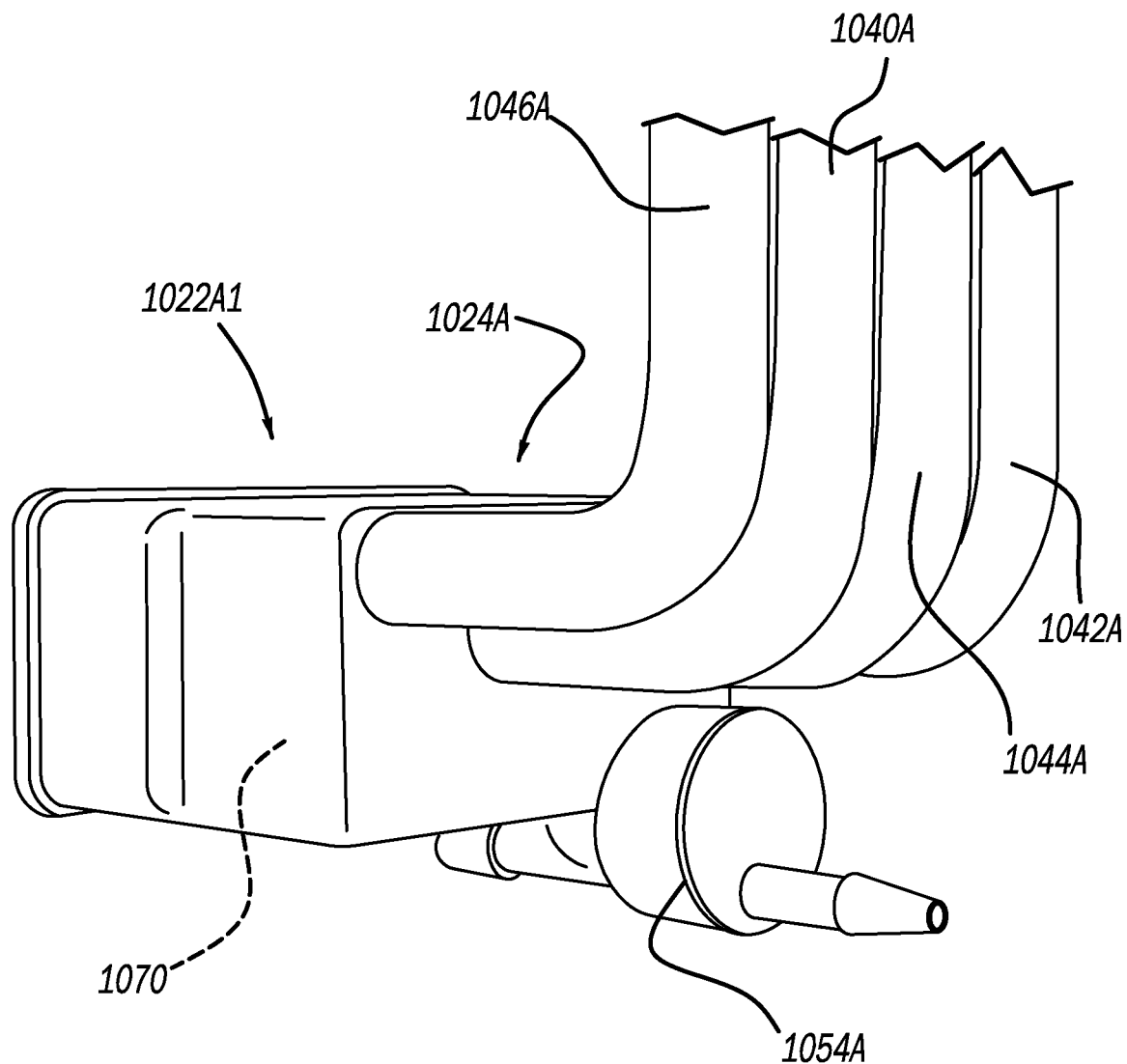
FIG. 5 is a perspective view of the vent shut-off assembly of the fuel tank system of FIG. 4.

Turning now to FIGS. 4 and 5, a fuel tank system 1010A constructed in accordance to another example of the present disclosure will be described. Unless otherwise described, the fuel tank system 1010A can include an evaporative emissions control system 1020A that incorporate features described above with respect to the fuel tank system 1010. The fuel tank system 1010A is incorporated on a saddle type fuel tank 1012A. A vent shut-off assembly 1022A1 can include a single actuator 1070 that communicates with a manifold 1024A to control opening and closing of three or more vent point inlets. In the example shown, the manifold assembly 1024A routs to a first vent 1040A, a second vent line 1042A and a third vent line 1044A. A vent 1046A routs to the canister (see canister 1032, FIG. 1). A liquid trap and a drain 1054A are incorporated on the manifold assembly 1024A. The fuel tank system 1010A can perform fuel tank isolation for high pressure hybrid applications without requiring a fuel tank isolation valve (FTIV). Further, the evaporative emissions control system 1020A can achieve the highest possible shut-off at the vent points. The system is not inhibited by conventional mechanical valve shut-off or reopening configurations. Vapor space and overall tank height may be reduced.

Figure 6:
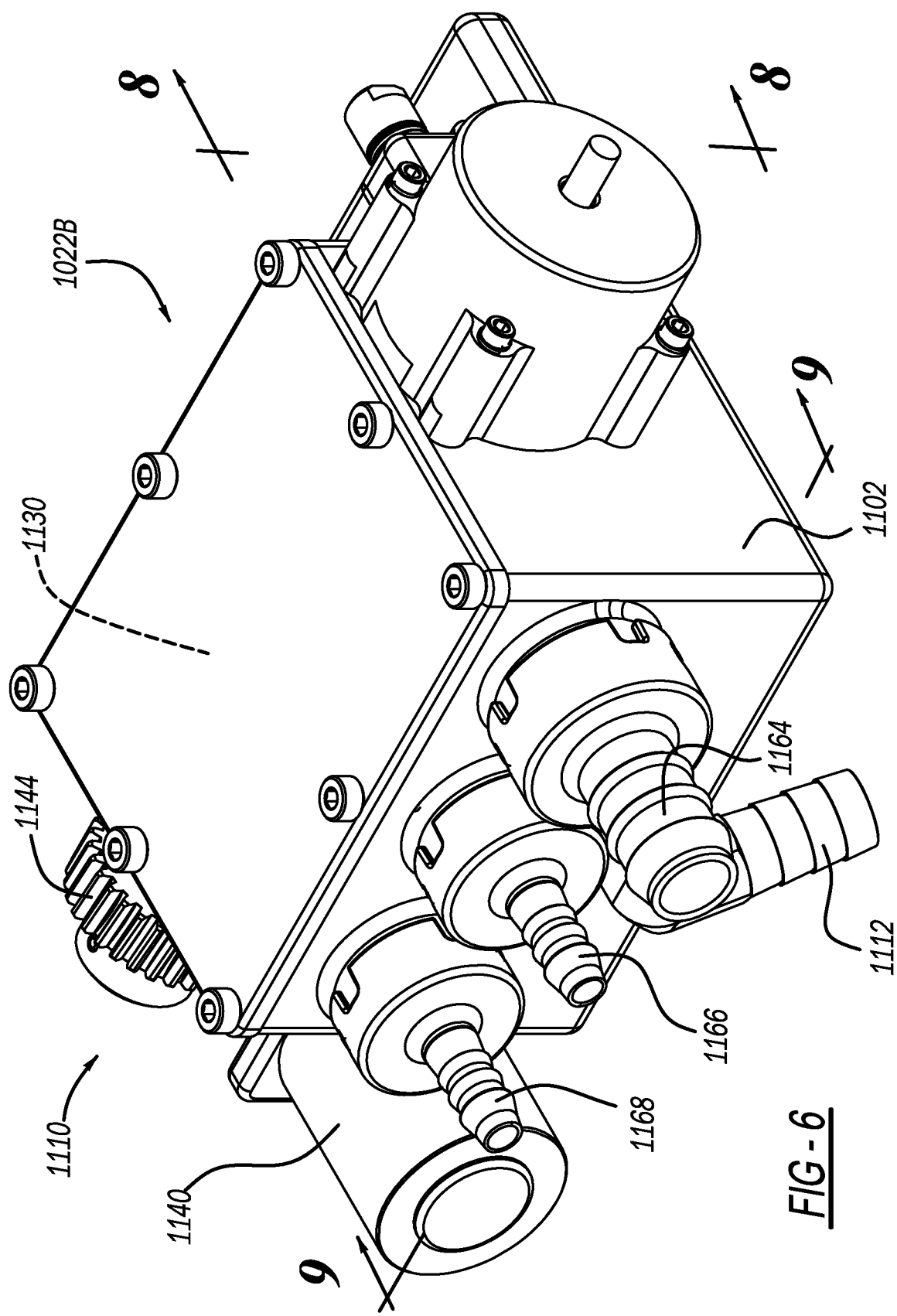
FIG. 6 is a top perspective view of a vent shut-off assembly constructed in accordance to additional features of the present disclosure.
Figure 7:
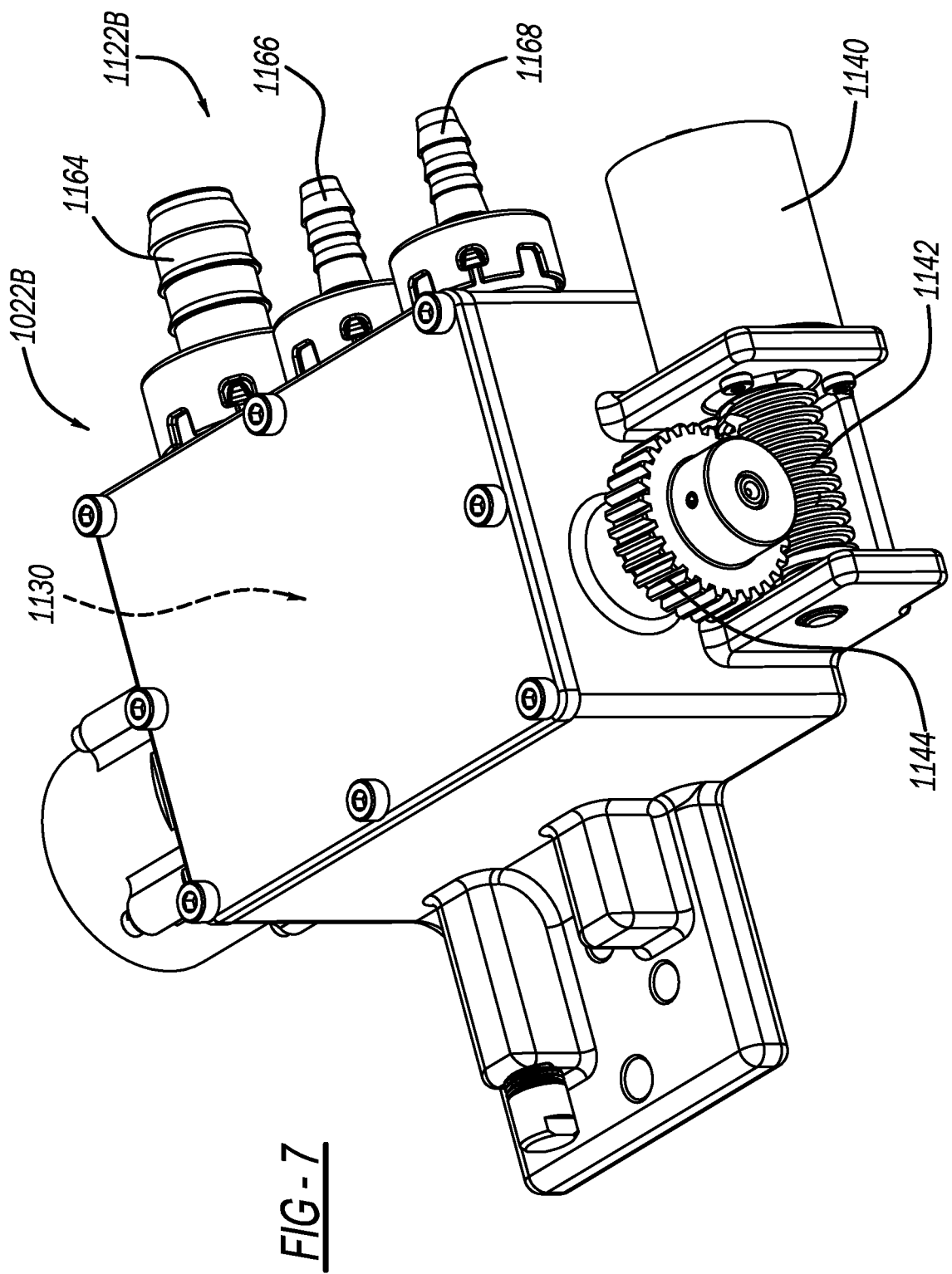
FIG. 7 is a bottom perspective view of the vent shut-off assembly of FIG. 6.
Figure 8:
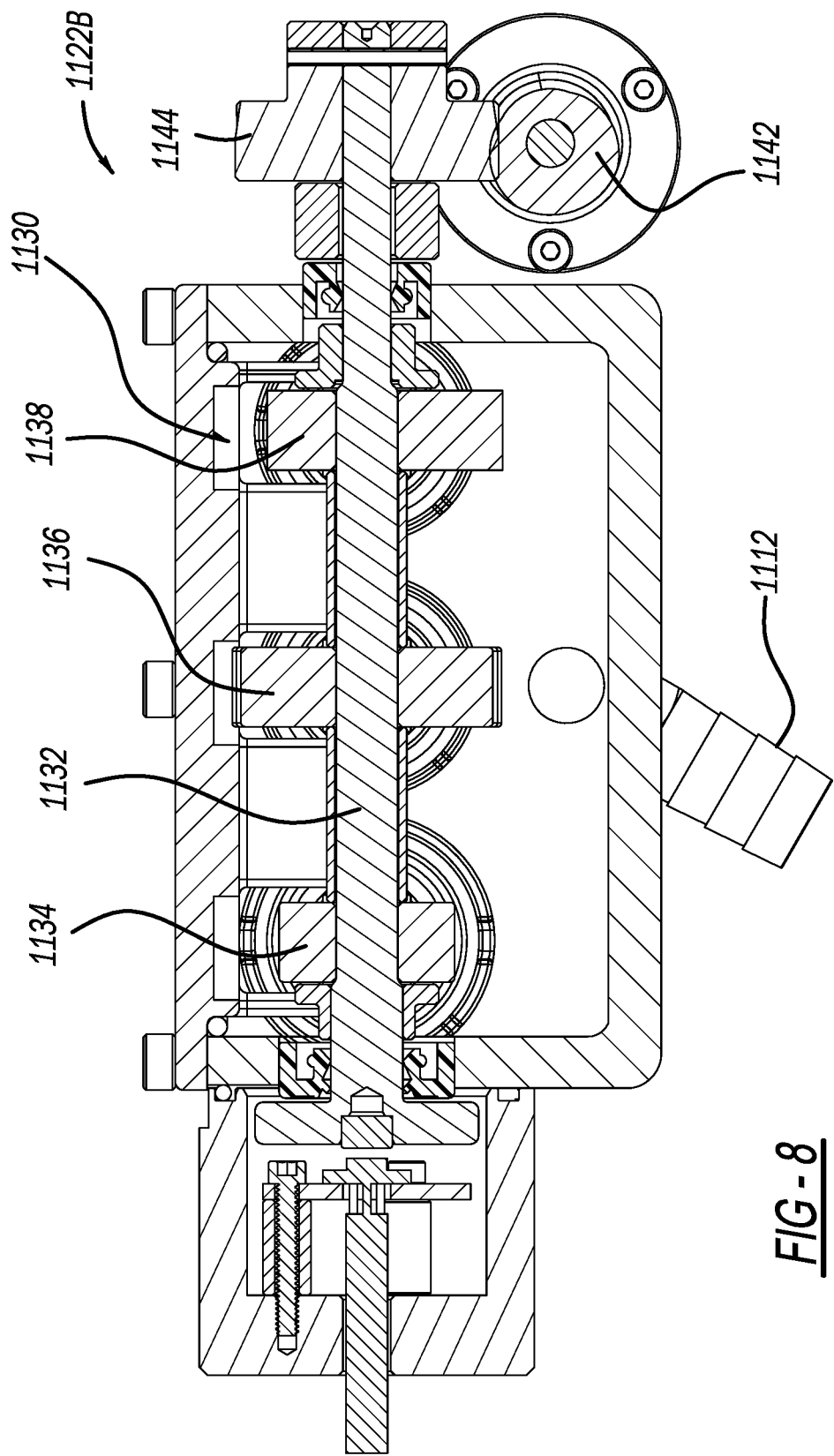
FIG. 8 is a sectional view of the vent shut-off assembly of FIG. 6 taken along lines 8-8.

Turning now to FIGS. 6-7, a vent shut-off assembly 1022B constructed in accordance to another example of the present disclosure will be described. The vent shut-off assembly 1022B includes a main housing 1102 that at least partially houses an actuator assembly 1110. A canister vent line 1112 routs to the canister (see canister 1032, FIG. 1). The actuator assembly 1110 can generally be used in place of the solenoids described above to open and close selected vent lines. The vent shut-off assembly 1022B includes a cam assembly 1130. The cam assembly 1130 includes a cam shaft 1132 that includes cams 1134, 1136 and 1138. The cam shaft 1132 is rotatably driven by a motor 1140. In the example shown the motor 1140 is a direct current motor that rotates a worm gear 1142 that in turn drives a drive gear 1144. The motor 1140 is mounted outboard of the main housing 1102. Other configurations are contemplated. The cams 1134, 1136 and 1138 rotate to open and close valves 1154, 1156 and 1158, respectively. The valves 1154, 1156 and 1158 open and close to selectively deliver vapor through ports 1164, 1166 and 1168, respectively. In one example the motor 1140 can alternately be a stepper motor. In other configurations, a dedicated DC motor may be used for each valve. Each DC motor may have a home function. The DC motors can include a stepper motor, a bi-directional motor, a uni-directional motor a brushed motor and a brushless motor. The home function can include a hard stop, electrical or software implementation, trip switches, hard stop (cam shaft), a potentiometer and a rheostat.

In one configuration, the ports 1164 and 1166 can be routed to the front and back of the fuel tank 1012. The port 1164 can be configured solely as a refueling port. In operation, if the vehicle is parked on a grade where the port 1166 is routed to a low position in the fuel tank 1012, the cam 1134 is rotated to a position to close the port 1164. During refueling, the valve 1154 associated with port 1164 is opened by the cam 1134. Once the fuel level sensor 1048 reaches a predetermined level corresponding to a "Fill" position, the controller 1030 will close the valve 1154. In other configurations, the cam 1134, valve 1154 and port 1164 can be eliminated leaving two cams 1136 and 1138 that open and close valves 1156 and 1158. In such an example, the two ports 1168 and 1166 can be 7.5 mm orifices. If both ports 1168 and 1166 are open, refueling can occur. If less flow is required, a cam position can be attained where one of the valves 1156 and 1158 are not opened all the way.

Turning now to FIGS. 10-13, a vent shut-off assembly 1022C constructed in accordance to another example of the present disclosure will be described. The vent shut-off assembly 1022C includes a main housing 1202 that at least partially houses an actuator assembly 1210. A canister vent line 1212 routs to the canister (see canister 1032, FIG. 1). The actuator assembly 1210 can generally be used in place of the solenoids described above to open and close selected vent lines. The vent shut-off assembly 1022C includes a cam assembly 1230. The cam assembly 1230 includes a cam shaft 1232 that includes cams 1234, 1236 and 1238. The cam shaft 1232 is rotatably driven by a motor 1240. In the example shown the motor 1240 is received in the housing 1202. The motor 1240 is a direct current motor that rotates a worm gear 1242 that in turn drives a drive gear 1244. Other configurations are contemplated. The cams 1234, 1236 and 1238 rotate to open and close valves 1254, 1256 and 1258, respectively. The valves 1254, 1256 and 1258 open and close to selectively deliver vapor through ports 1264, 1266 and 1268, respectively. In one example the motor 1240 can alternately be a stepper motor. A drain 1270 can be provided on the housing 1202. A liquid trap pump 1280 can pump liquid fuel out of the liquid trap through the drain 1270.

In one configuration, the ports 1264 and 1266 can be routed to the front and back of the fuel tank 1012. The port 1264 can be configured solely as a refueling port. In operation, if the vehicle is parked on a grade where the port 1266 is routed to a low position in the fuel tank 1012, the cam 1236 is rotated to a position to close the port 1266. During refueling, the valve 1254 associated with port 1264 is opened by the cam 1234. Once the fuel level sensor 1048 reaches a predetermined level corresponding to a "Fill" position, the controller 1030 will close the valve 1254. In other configurations, the cam 1234, valve 1254 and port 1264 can be eliminated leaving two cams 1236 and 1238 that open and close valves 1256 and 1258. In such an example, the two ports 1268 and 1266 can be 7.5 mm orifices. If both ports 1268 and 1266 are open, refueling can occur. If less flow is required, a cam position can be attained where one of the valves 1256 and 1258 are not opened all the way.

Figure 11:
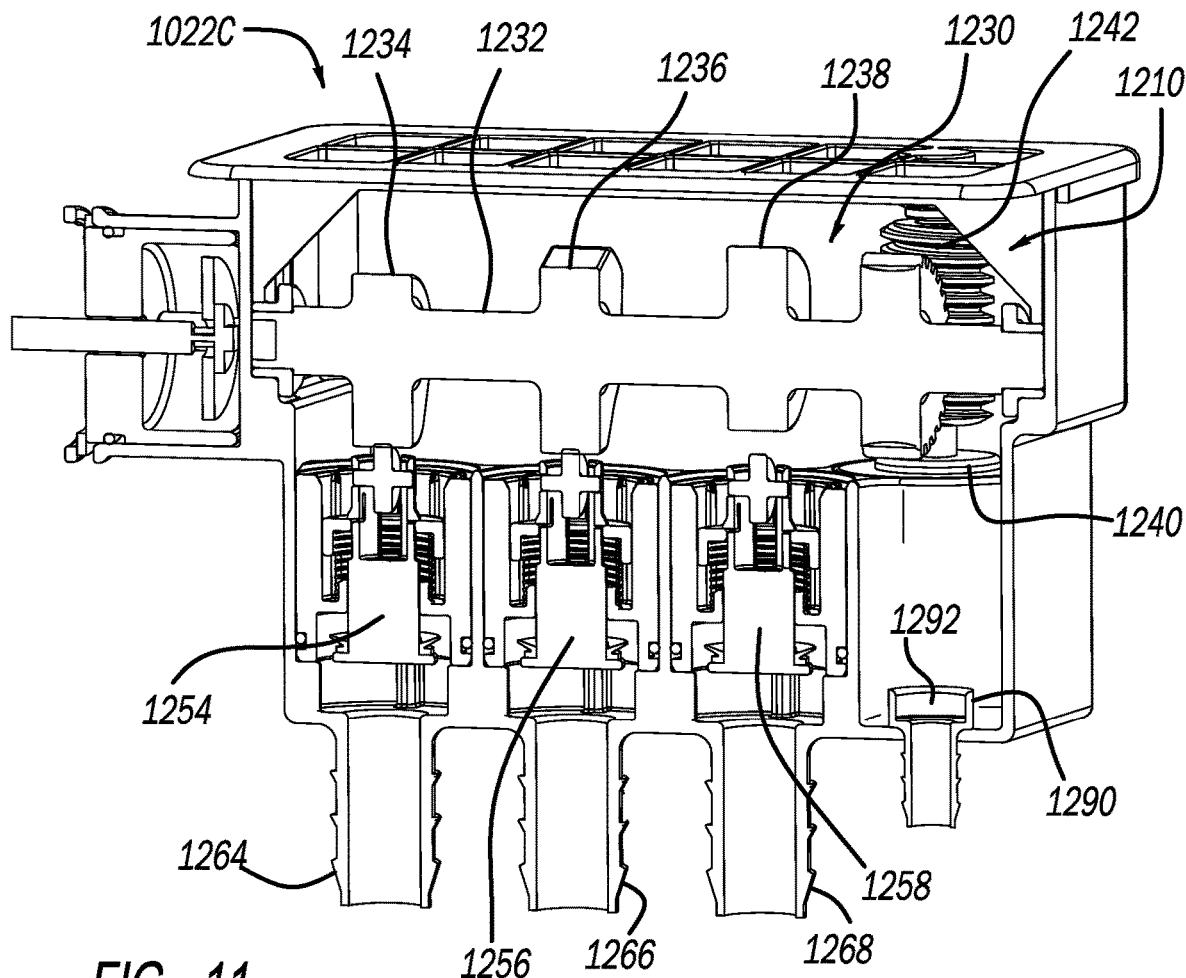
FIG. 11 is a sectional view of the vent shut-off assembly of FIG. 10 taken along lines 11-11.
Figure 12:
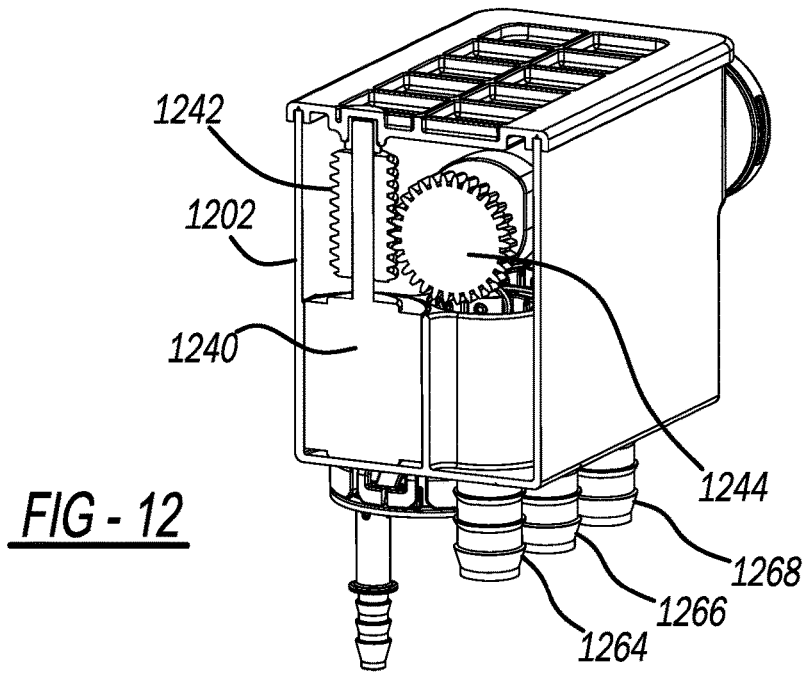
FIG. 12 is a sectional view of the vent shut-off assembly of FIG. 10 taken along lines 12-12.

In one method of use, the evaporative emissions control system 1020 can control venting with the vent shut-off assembly (such as 1022C) during a purge of the purge canister 1032. According to one method of the present disclosure, the control module 1030 can isolate the fuel tank 1012, 1012A from the vent canister 1032 to increase the efficiency of the canister purge event. To isolate the fuel tank 1012, 1012A, the control module 1030 can send a signal to the vent shut-off assembly such as any of the vent shut-off assemblies 1022, 1022A, 1022A1, 1022B, 1022C described herein to close all vents (such as vents 1254, 1256, 1258; FIG. 11). As a result, no vapor is communicated between the fuel tank 1012, 1012A by way of the vent shut-off assembly, such as vent shut-off assembly 1022C. In this regard, the engine is only drawing a vacuum from the purge canister 1032 and not both the purge canister 1032 and the fuel tank 1012, 1012A improving efficiency of the purge event.

Explained further, with reference to FIG. 1, the canister vent line 1212 does not communicate any vapor from the vent shut-off assembly 1022 to the purge canister 1032 during a purge event because all of the vents (such as vents 1041A, 1041B) are closed. Instead, dedicated fresh air 1308 is drawn into the canister inlet 1310 and delivered from the purge canister 1032 to the engine 1320 through the canister to engine vent line 1322. The instant method of purging the purge canister 1032 exclusively with fresh air increases efficiency of a purge event over prior art methods that may also draw vapor from the fuel tank 1022 by way of the vent shut-off assembly 1022 or otherwise. The evaporative emissions control system 1020 according to the present disclosure can effectively accomplish this efficient purge by controlling venting with one of the vent shut-off assemblies 1022, 1022A, 1022A1, 10228, 1022C. It is appreciated that the evaporative emissions control system 1020 can control venting during a purge event in either of the solenoid based or cam-based systems described herein.

Figure 9:
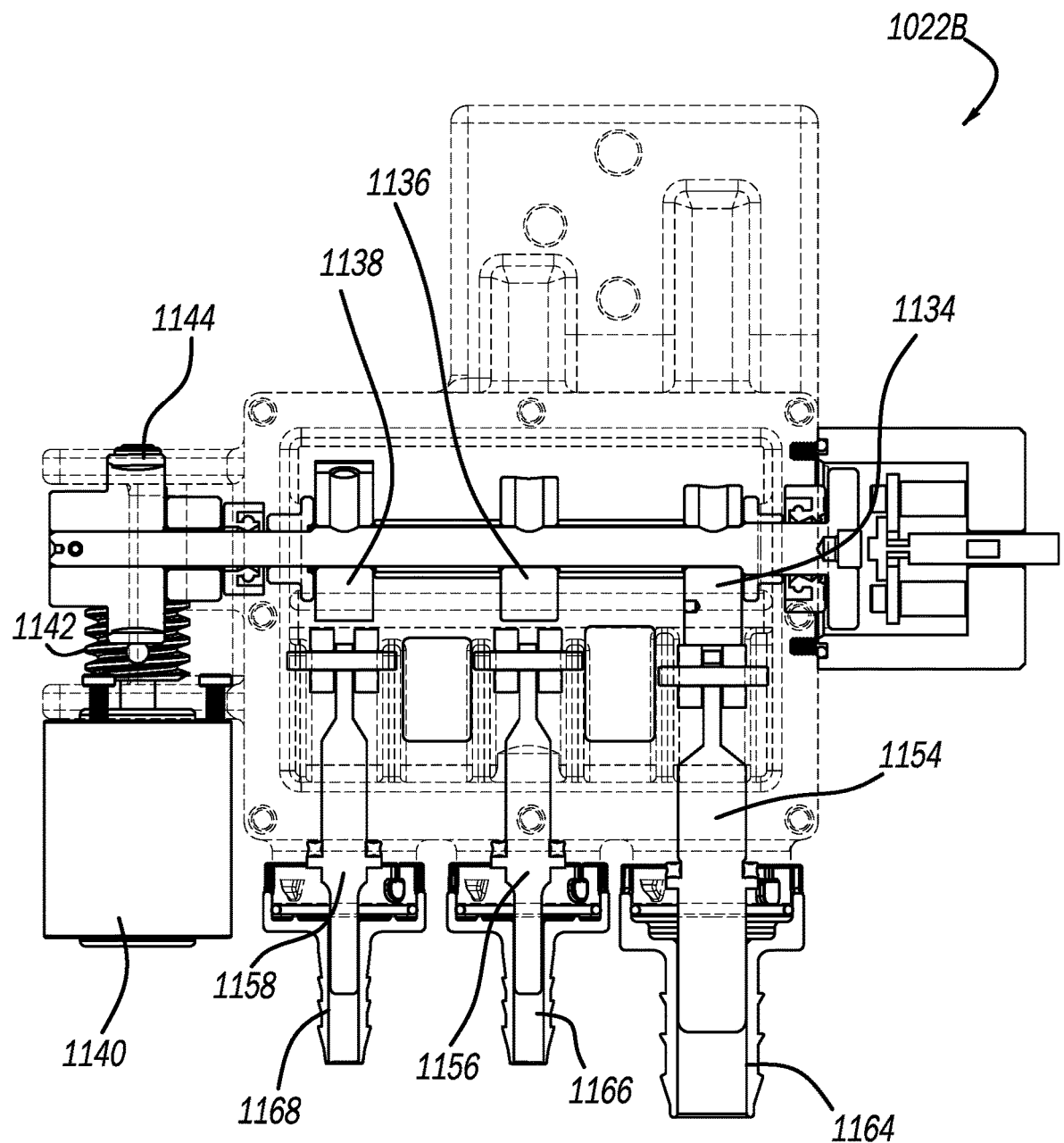
FIG. 9 is a sectional view of the vent shut-off assembly of FIG. 6 taken along lines 9-9.
Figure 10:
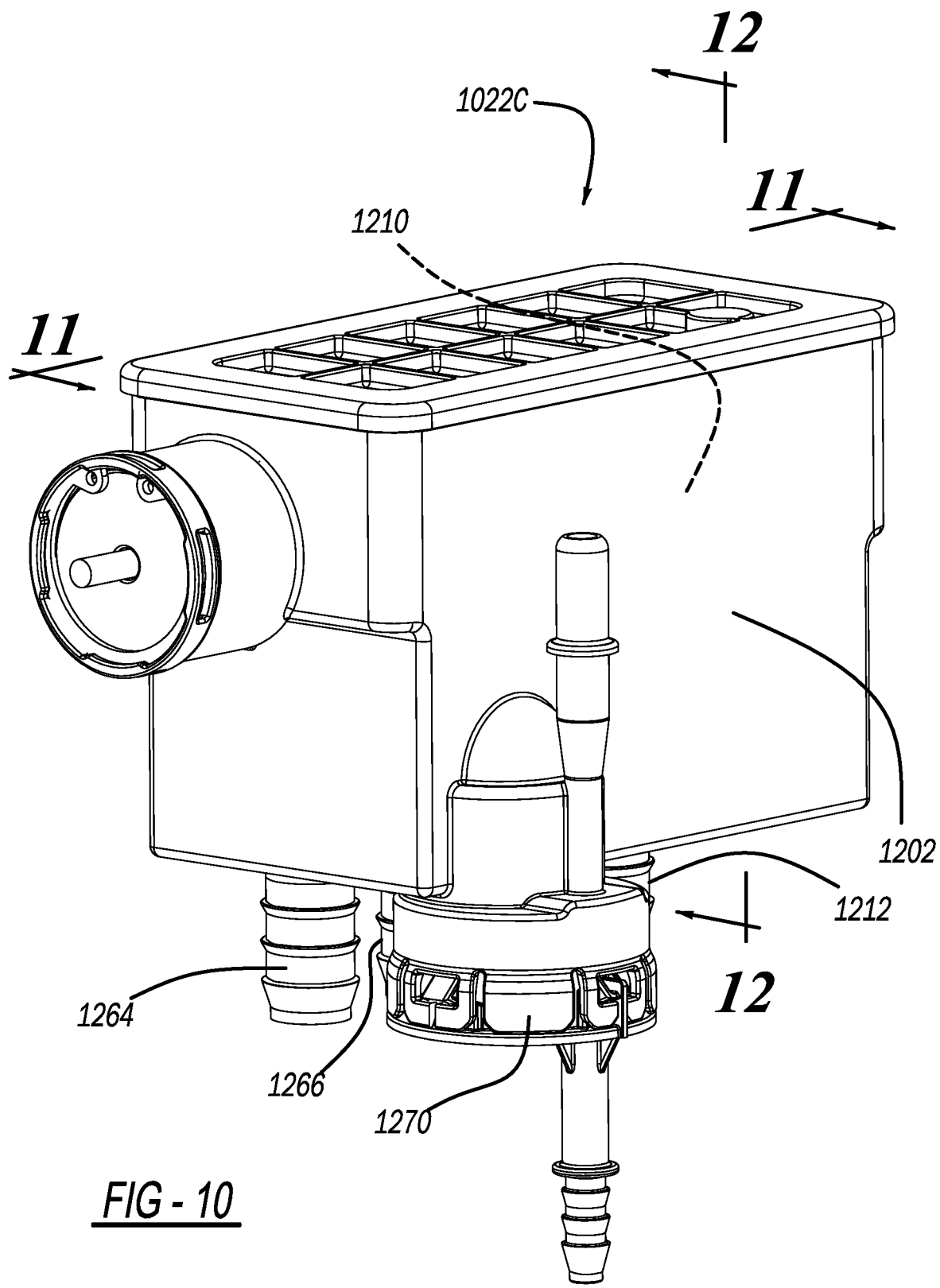
FIG. 10 is a front perspective view of a vent shut-off assembly constructed in accordance to another example of the present disclosure.
Figure 14:
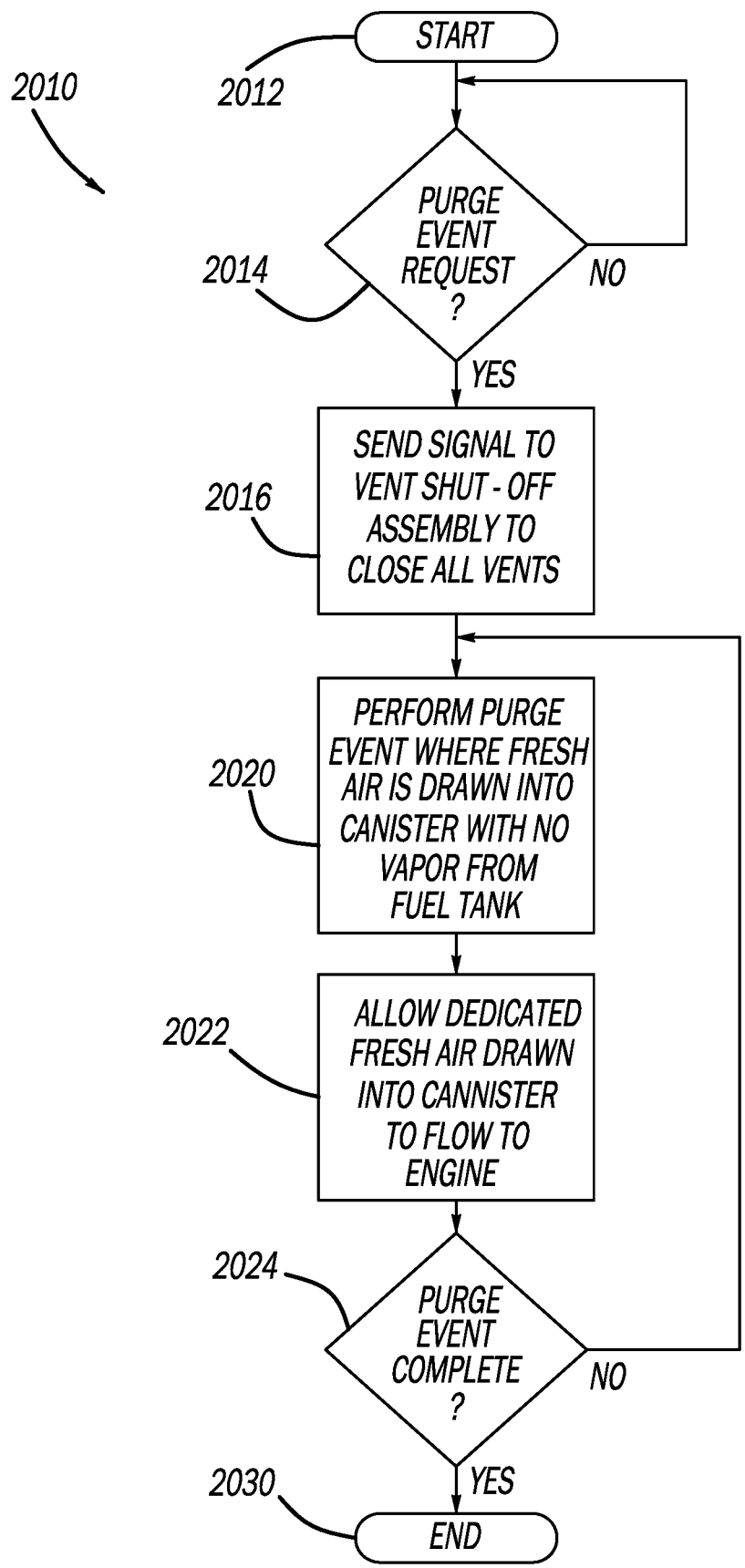
FIG. 14 is an exemplary flow diagram of a method for operating an evaporative emissions control system according to one example of the present disclosure.

With reference to FIG. 14 a method for operating the evaporative emissions control system 1020 for use with a fuel tank such as the fuel tank 1012, 1012A is shown and generally identified at reference 2010. Control starts at 2012. At 2014, control determines if a purge event has been requested. If a purge event has been requested, control sends a signal at step 2016 to the vent shut off assembly 1022 to close all vents (such as 1041A, 1041B (FIG. 1), or vent lines 1040A, 1042A, 1044A (FIG. 4). In one example, the cams 1134, 1136 and 1138 rotate to close the valves 1154, 1156 and 1158 to close respective ports 1164, 1166 and 1168 (FIG. 9). Those skilled in the art will recognize that any of the vent shut off assemblies disclosed herein can be adapted to close all available vents (whether it be one, two, three or more vents provided in the fuel tank depending on application). At step 2016, vapor is now precluded from passing from the fuel tank 1012, 1012A through line 1212 (FIG. 1) to the purge canister 1032. If a purge event is not detected at 2014, control loops to 2014.

At step 2020, control a purge event is performed where fresh air 1308 (FIG. 1) is drawn into the canister 1032. The air drawn into the canister 1032 is delivered to the engine 1320 by way of engine vent line 1322 at step 2022. At step 2024 control determines if the purge event is complete. If the purge event is not complete, control loops to step 2020. If the purge event is complete, control ends at step 2030.

Knowledge of a particular fill rate of the refueling nozzle in an automotive application is useful in controlling any of the evaporative emissions control systems described herein such as the evaporative emissions control system 1020 for optimal refueling quality. In one exemplary method according to the present disclosure, the fill rate from a given refueling nozzle can be calculated or estimated by monitoring the fuel tank level sensor 1048 during a fill event. In another example, the fill rate can be calculated or estimated indirectly by interpreting the pressure changes within the fuel tank such as fuel tank 1012 or 1012A with the tank pressure sensor 1060A. The controller 1030 can use information from the fuel tank level sensor 1048 and/or pressure signals from the pressure sensor 1060A along with known fuel tank characteristics (i.e. geometry, etc.) to determine the fill rate of the refueling nozzle.

Once the fill rate has been determined, the controller 1030 can operate the vent shut-off assembly, such as any of the vent shut-off assemblies 1022, 1022A, 1022A1, 1022B, 1022C described herein based on the known fill rate. With knowledge of the current fill rate, the evaporative emissions control system 1020 can control the vent shut-off assemblies to optimize the refueling event performance. Optimizing the refueling event can include mitigating premature shut off, spit, spray, and well back. In addition, fill volume accuracy is improved. Further, trickle fill/round up volume can be minimized. It will be appreciated that the controller 1030 can operate the vent shut-off assemblies differently for a fast fill rate as compared to a slow fill rate.

The controller 1030 can open one or more vents 1054, 1056, 1058 (or increase the effective orifice size of existing paths) with the goal to not have the fill nozzle click-off until 95% fill has been achieved. It is appreciated that other percentages may be used. Subsequent to a first nozzle click-off the fill event enters a round up or trickle phase fill portion of the fuel fill. There are requirements as to what volume of fuel is allowed to be added to the fuel tank. The controller 1030 can open the vents 1041A, 1041B (or increase the effective orifice size of existing paths) in a way to reduce tank pressure and inhibit spit, spray and/or well back during the trickle phase fill portion.

With reference to FIG. 16A, a method for operating the evaporative emissions control system 1020 according to another method of the present disclosure is shown and generally identified at reference 2050. Control starts at 2052. At 2054, control determines if a refueling event has been detected. If a refueling event has been detected, control determines the fill rate of fuel entering the fuel tank 1012, 1012A at 2060. If a refueling event has not been detected, control loops to step 2054. At 2062, control operates the vent shut-off assembly such as any of the vent shut-off assemblies 1022, 1022A, 1022A1, 1022B, 1022C described herein based on the fill rate at 2062. Control ends at 2070.

In another method, the evaporative emissions control system 1020 can monitor the pressure of the fuel tank 1012 or 1012A with the tank pressure sensor 1060A. If a pressure spike is detected during refueling and before the "full" state, the effective venting orifice size can be increased (by opening one or more of the vents such as vents 1054, 1056, 1058, FIG. 11) to quickly reduce the tank pressure and thereby prevent premature shut-off. Tank pressure can also be monitored during the trickle fill/round up portion of the refueling event to inhibit spit, spray and/or well back by controlling the opening of one or more vents.

Figure 15:
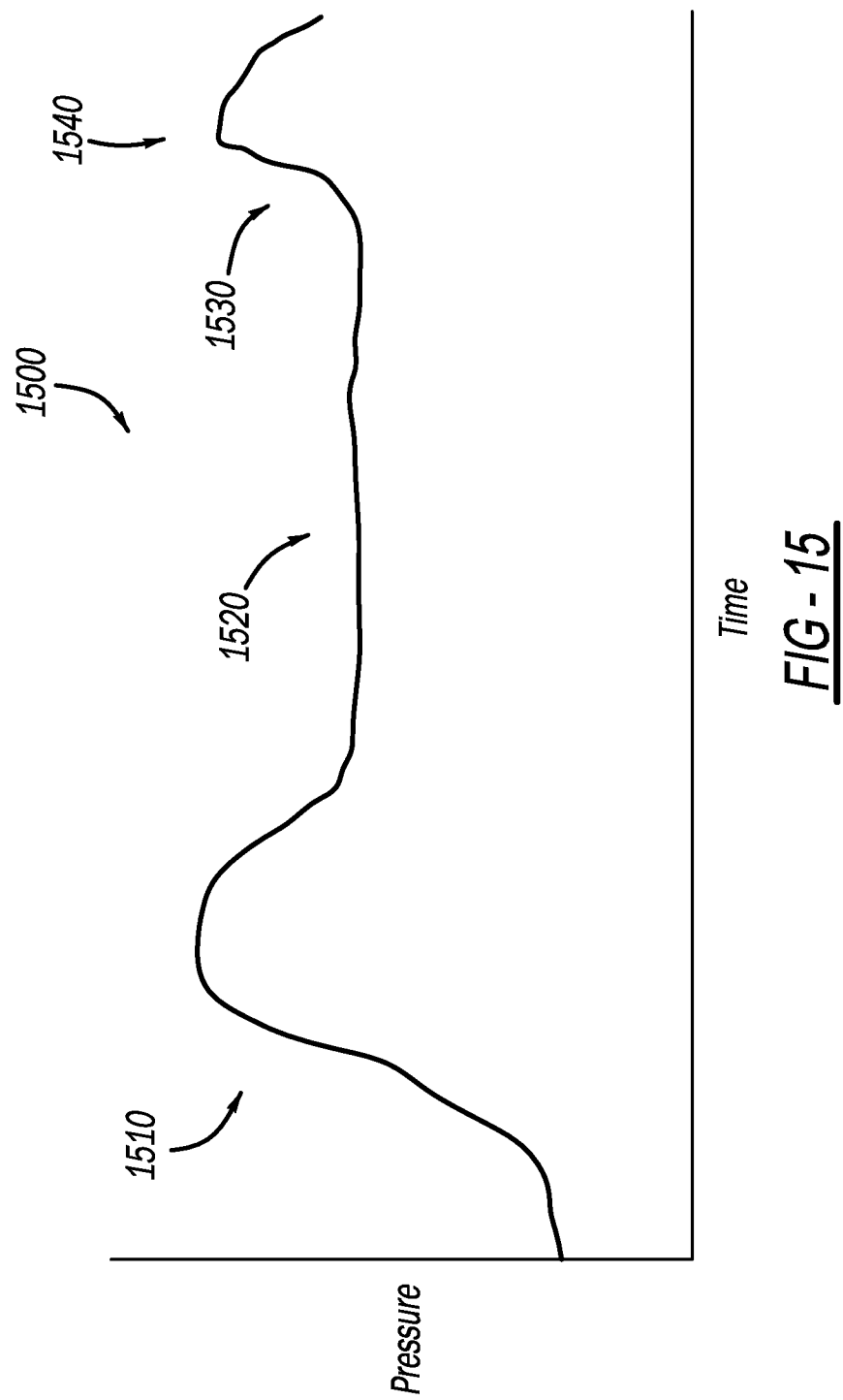
FIG. 15 is a plot of an exemplary fuel fill event.

A method of controlling the evaporative emissions control system 1020 according to another example will be described. With reference to FIG. 15, an exemplary fuel fill event 1500 is shown. In this regard, tank pressure typically will increase during a first fill time 1510 and plateau during a second fill time 1520. In some examples, the second fill time 1520 may include a plateau that slightly slopes downwardly. In the fill event 1500 a spit back or premature shut off event 1530 occurs during a third fill time 1540. The evaporative emissions control system 1020 can monitor this tank pressure and when an event 1530 is about to occur, the evaporative emission control system 1020 can open one or more vents 1054, 1056, 1058 (or increase the effective orifice size of existing paths) to reduce tank pressure spike and avoid spit, spray and/or premature shut-off.

The instant method can also be particularly useful in saddle tank configurations such as the fuel tank 1012A (FIG. 4). Explained further, as fuel fills the fuel tank lobe associated with the fill port, the fuel level rises until a level where the fuel will "spill" over into the second lobe. In some scenarios, such a process may create unwanted pressure spikes that can negatively affect a quality fill event. The evaporative emissions control system 1020 can monitor this tank pressure and can open one or more vents 1041A, 1041B (or increase the effective orifice size of existing paths). The instant method can also take into consideration fill level in combination with fuel tank pressure to more accurately differentiate an "unwanted" pressure spike with an expected pressure rise resulting in a "full" fuel tank.

Figure 16:
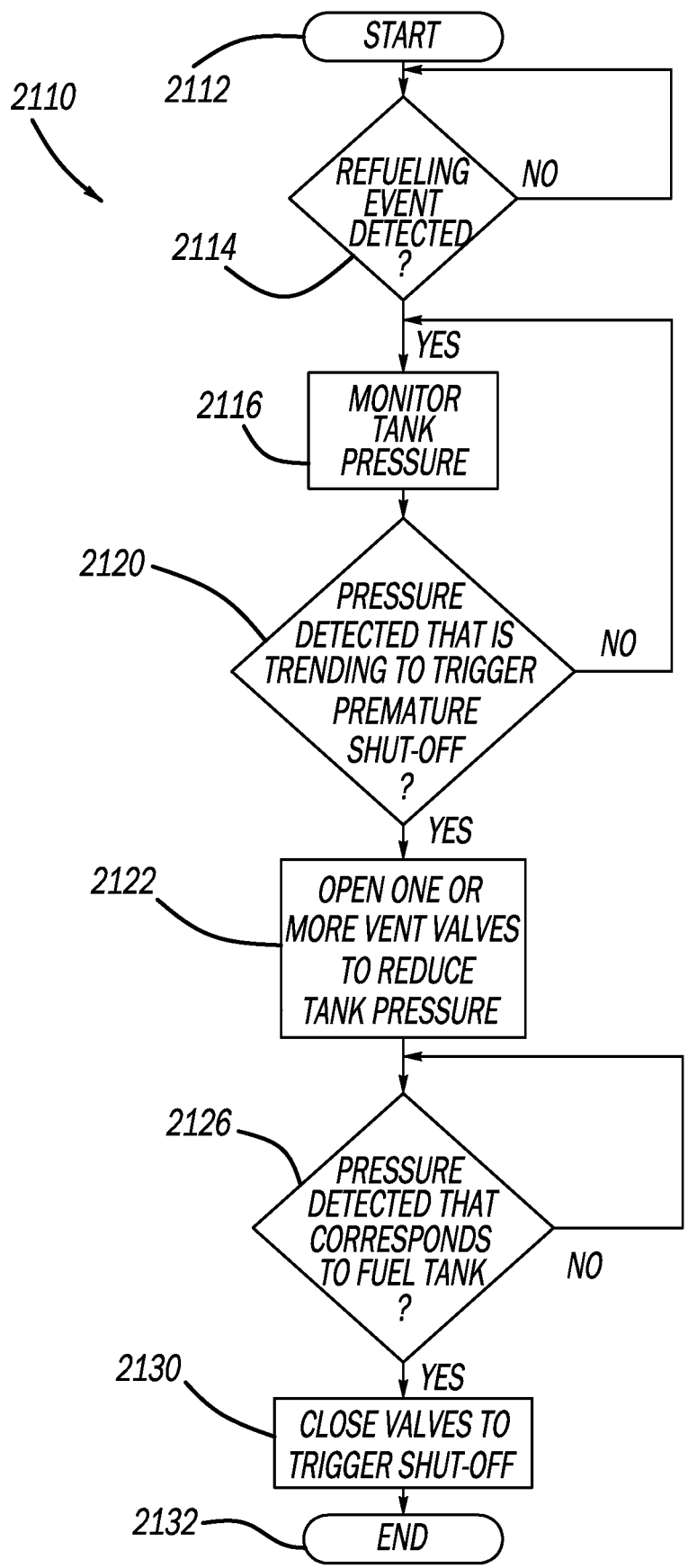
FIG. 16 is an exemplary flow diagram of a method for operating an evaporative emissions control system according to another example of the present disclosure.

With reference to FIG. 16, a method for operating the evaporative emissions control system 1020 for use with a fuel tank such as the fuel tank 1012, 1012A is shown and generally identified at reference 2110. Control starts at 2112. At 2114, control determines if a refueling event has been detected. If a refueling event has been detected, control monitors the pressure in the fuel tank 1012, 1012A at 2116. Pressure can be monitored by the tank pressure sensor 1060A or other methods described herein. If a refueling event has not been detected, control loops to step 2114. Control determines whether a pressure has been detected in the fuel tank that is trending to trigger a premature shut-off at 2120. A premature shut-off or PSO is defined herein as an in-tank pressure that causes a refueling nozzle to shut-off before a desired fuel level fill has been attained.

If control determines that a pressure has been detected that is trending to trigger a premature shut-off at 2110, control opens one or more vent valves 1154, 1156 and 1158 at 2122 to reduce pressure in the fuel tank 1012, 1012A. By "opening", the present disclosure contemplates that the valves 1154, 1156 and/or 1158 can be opened fully or only partially to reduce pressure according to a given application. In this regard, control may determine that opening valve 1154 by 10% (or other percentage below 100%) will effectively reduce tank pressure to prevent a premature shut-off. At 2126, control determines whether a pressure is detected that corresponds to a full fuel tank. If control determines the pressure is consistent with a full fuel tank at 2126, control closes the valves 1154, 1156 and 1158 at 2130 to trigger a desired shut-off of the fuel nozzle. If control determines that pressure is not consistent with a full fuel tank at 2126, control loops to 2126. Control ends at 2132.

Minimizing the amount of canister loading (the amount of hydrocarbon vapor transmitted to the canister) during an automotive refueling event has always been a desirable objective. Traditional fuel systems have employed a static plumbing arrangement between the fuel tank and the canister where the vapor flow rates are fixed based on the physical orifice sizes of the components involved. Using the evaporative emissions control system 1020 disclosed herein, which has an electrically controlled, variable orifice venting configuration, the refueling event can be controlled to minimize the amount of vapor directed to the canister 1032.

As regulations continue to become more stringent, increased challenges are placed upon the fuel tank venting system. One such challenge is keeping the canister size manageable, and keeping canister loading to a minimum. In order to best meet regulations, it is desirable to store as little hydrocarbon vapor (fuel vapor) as possible in the carbon canister 1032. The present disclosure helps to optimize (minimize) the amount of vapor transmitted to the canister 1032 during a refueling event.

The present disclosure uses an electrically controlled, variable orifice to regulate the flow of vapor through vapor line 1212 (FIG. 1) to the canister 1032 during a refueling event. Referring to FIG. 9 as an example, the phrase "variable orifice" is used to denote a partial opening of any of the valves 1154, 1156 and 1158 that allows less than 100% flow into the main housing 1202 and therefore a reduced percentage of flow through the line 1212 to the canister 1032. It will be appreciated that additionally or alternatively an orifice (valve) can be provided at the line 1212 for providing variable flow to the canister 1032. Traditional systems utilize fixed orifice or plumbing arrangements. The variable orifice would allow the opening or size of the orifice to be controlled as a function of the tank pressure and other system variables (fill level, fill rate, temperature, etc.). The controller 1032 would utilize (command) the smallest orifice size possible without creating premature shut-offs (PSOs) and other undesirable refueling events. Referring to the control flow in FIG. 17, at step 2062, the controller 1032 can command any (or all) of the valves 1154, 1156 and 1158 to attain a "partial" opening without creating premature shut-offs and other undesirable refueling events. In practice, once a refueling event is detected, the variable orifice would be controlled to maintain a specific tank pressure. This pressure would be low enough so as to not create a PSO. By allowing this pressure to build to some threshold, the amount of vapor being transmitted to the canister 1032 would be minimized.

The evaporative emissions control system 1020 can be configured to use the liquid trap pump 1280 to conduct a fuel tank leak check according to one example of the present disclosure. The liquid trap pump 1280 can be configured as a vapor pump to increase pressure differential and improve the accuracy of pressure/vacuum decay testing and to increase the ability to conduct testing in a wider set of environmental conditions. The Environmental Protection Agency (EPA) has recently decreased the detectable leak equivalent orifice from 0.040" to 0.020". Current prior art methods of leak testing rely on either using engine vacuum or diurnal pressure cycles to create a pressure differential in which on-board diagnostic (OBD) leak testing is based. The evaporative emissions control system 1020 can activate the liquid trap pump 1280 to create a vacuum pump and pressure differential in the fuel tank such as fuel tank 1012 or 1012A (all vents such as vents 1041A, 1041B are closed).

In one method of use, the controller 1030 can initiate a leak test event. In this regard, the controller 1030 can signal the liquid trap pump 1280 to generate a pressure within the fuel tank 1012, 1012A. The liquid trap pump 1280 can be set to operate until reaching a threshold pressure. The pressure can be determined in any manner such as by the pressure sensor 1060A (FIG. 1). In this way, the liquid trap pump 1280 is dual purpose operating in one mode to drain liquid from the liquid trap and operating in a second mode to generate a pressure within the fuel tank during a leak test. With the configuration of the present disclosure, the cost of additional hardware for a dedicated pressure pump is avoided.

With reference to FIG. 18, a method of operating an evaporative emissions control system according to another example of the present disclosure is shown and generally identified at reference 2210. Control starts at 2212. At 2214, control determines whether a leak test request has been made. If a leak test request has been made, pressure is generated in the fuel tank 1012 with the liquid trap pump 1280 at 2220. If a leak test request has not been made, control loops to 2214. A leak test is conducted at 2222. At 2230 the pressure is relieved in the fuel tank 1012, 1012A. Control ends at 2240.

With particular reference to FIG. 11, an evaporative emissions control system constructed in accordance to another example of the present disclosure will be described. The vent shut-off assembly 1022C incorporates a fuel inlet 1290 that allows liquid fuel into the vent shut-off assembly 1022C. The fuel inlet 1290 allows liquid fuel to enter the housing of the vent shut-off assembly 1022C where it can be recirculated between the fuel tank 1012, 1012A and the vent shut-off assembly 1022C. In one configuration, a valve 1292 can be arranged at the fuel inlet 1290 for selectively opening and closing the fuel inlet 1290. In so doing, the incoming fuel would be agitated with the vapor vent atmosphere to increase vapor generation when recycled back to the bulk fuel storage. In this regard, the evaporative emissions control system can be used to agitate bulk liquid fuel on demand to increase vapor generation. In another advantage, the evaporative emissions control system can be used to keep aged fuel mixed for proper properties as expected by the engine.

With reference to FIG. 19, a method for operating an evaporative emissions control system according to another example of the present disclosure is shown and identified at reference 2310. Control starts at 2312. At 2314 control determines if a liquid fuel recirculation request has been made. If a liquid fuel recirculation request has not been made, control loops to 2314. If a liquid fuel recirculation request has been made, control opens the valve 1292 at the fuel inlet 1290. At 2322 liquid fuel is recirculated between the fuel tank 1012, 1012A and the vent shut-off assembly, such as any of the vent shut-off assemblies 1022, 1022A, 1022A1, 1022B, 1022C described herein. At 2330 control determines if a desired vapor amount has been generated. If a desired vapor amount has been generated control ends at 2340. If a desired vapor amount has not been generated, control loops to 2322.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A fuel tank system comprising:
   a fuel tank;
   a fuel tank pressure sensor that senses a pressure of the fuel tank;
   a first vent valve that moves between open and closed positions to selectively permit venting through a first port;
   a first vent line disposed in the fuel tank and routed between the first port and an elevated position within the fuel tank;
   an evaporative emissions control system configured to recapture and recycle emitted fuel vapor;
   a cam driven tank venting control assembly having a rotary actuator that rotates a cam assembly based on a refueling event being detected, the cam assembly having at least a first cam having a first cam profile configured to selectively open and close the first port based on operating conditions; and
   a controller that is programmed to and commands a signal to the tank venting control assembly to open the first port a predetermined minimal amount to a position between the open and closed positions as a function of tank pressure sensed by the fuel tank pressure sensor to reduce pressure within the fuel tank during the refueling event.

2. The fuel tank system of claim 1 wherein the predetermined minimal amount does not trigger a premature shut off (PSO).

3. The fuel tank system of claim 1 wherein the predetermined minimal amount is further a function of at least one of fill rate, fill level and temperature.

4. The fuel tank system of claim 1, further comprising:
   a second vent line routed between the cam driven tank venting control assembly and a canister.

5. The fuel tank system of claim 4, further comprising a housing that at least partially houses the rotary actuator.

6. The fuel tank system of claim 5 wherein the controller operates the tank venting control assembly to minimize an amount of vapor delivered to the canister during refueling.

7. A fuel tank system comprising:
   a fuel tank;
   a fuel tank pressure sensor that senses a pressure of the fuel tank;
   a first vent valve that moves between an open position, a closed position, and positions between the open and closed positions to selectively permit venting through a first port;
   a first vent line disposed in the fuel tank and routed between the first port and a location within the fuel tank;
   an evaporative emissions control system configured to recapture and recycle emitted fuel vapor;
   a cam driven tank venting control assembly having a rotary actuator that rotates a cam assembly based on a refueling event being detected, the cam assembly having at least a first cam having a first cam profile configured to selectively open and close the first port based on operating conditions; and
   a controller that is programmed to and commands a signal to the tank venting control assembly to open the first port to an intermediate position between the open and closed positions as a function of tank pressure sensed by the fuel tank pressure sensor to reduce pressure within the fuel tank during the refueling event.

8. The fuel tank system of claim 7 wherein the controller operates the tank venting control assembly to minimize an amount of vapor delivered to the canister during refueling.

9. The fuel tank system of claim 7 wherein the intermediate position corresponds to a predetermined minimal amount that is a function of at least one of fill rate, fill level and temperature.

10. The fuel tank system of claim 1 wherein the cam driven tank venting control assembly is disposed in the fuel tank.

11. The fuel tank system of claim 1, further comprising a float level sensor assembly that provides a fill level indication to the controller, wherein the controller commands a signal to the tank venting control assembly to open the first port as a function of tank pressure and as a function of fill level.

12. The fuel tank system of claim 7 wherein the cam driven tank venting control assembly is disposed in the fuel tank.

13. The fuel tank system of claim 7, further comprising a float level sensor assembly that provides a fill level indication to the controller, wherein the controller commands a signal to the tank venting control assembly to open the first port as a function of tank pressure and as a function of fill level.

\* \* \* \* \*